United States Patent
Yamauchi

(10) Patent No.: US 10,659,628 B2
(45) Date of Patent: May 19, 2020

(54) PROCESSING APPARATUS AND COMMUNICATION METHOD

(71) Applicant: CANON KABUSHIKI KAISHA, Tokyo (JP)

(72) Inventor: Kazunori Yamauchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/665,793

(22) Filed: Aug. 1, 2017

(65) Prior Publication Data

US 2017/0331962 A1 Nov. 16, 2017

Related U.S. Application Data

(60) Continuation of application No. 14/961,034, filed on Dec. 7, 2015, which is a division of application No. (Continued)

(30) Foreign Application Priority Data

Mar. 5, 2012 (JP) .................................. 2012-048624

(51) Int. Cl.
*H04N 1/00* (2006.01)
*H04W 4/80* (2018.01)
(Continued)

(52) U.S. Cl.
CPC ....... *H04N 1/00233* (2013.01); *G06F 3/1204* (2013.01); *G06F 3/126* (2013.01);
(Continued)

(58) Field of Classification Search
None
See application file for complete search history.

(56) References Cited

U.S. PATENT DOCUMENTS

2001/0003180 A1 * 6/2001 Sakai .................. G06Q 20/102
705/40
2003/0156197 A1 8/2003 Watanabe et al.
(Continued)

FOREIGN PATENT DOCUMENTS

CN 1442996 A 9/2003
CN 1811693 A 8/2006
(Continued)

OTHER PUBLICATIONS

Chinese Office Action issued in corresponding Chinese Application No. 201510505309.0 dated Jul. 18, 2017.
(Continued)

*Primary Examiner* — Richa Mishra
(74) *Attorney, Agent, or Firm* — Venable LLP

(57) ABSTRACT

An embodiment of the invention has been made to solve a problem that it is impossible to store externally transmitted job information if a printer apparatus is in a hard-off state and it is, therefore, necessary to store the job information in an external apparatus on the transmission side. In the embodiment, a wireless communication unit which can transmit/receive data even if no power is supplied receives job information from an external terminal, and stores it in a non-volatile memory. When an information processing apparatus is supplied with power, and enters a normal activation state, it executes the job stored in the non-volatile memory.

13 Claims, 29 Drawing Sheets

Related U.S. Application Data

14/617,211, filed on Feb. 9, 2015, which is a continuation of application No. 13/777,365, filed on Feb. 26, 2013.

(51) Int. Cl.
  *G06K 15/00* (2006.01)
  *G06F 3/12* (2006.01)
  *H04M 1/02* (2006.01)

(52) U.S. Cl.
  CPC .......... *G06F 3/1267* (2013.01); *G06F 3/1292* (2013.01); *G06F 3/1296* (2013.01); *G06K 15/4055* (2013.01); *H04M 1/0202* (2013.01); *H04N 1/00244* (2013.01); *H04N 1/00307* (2013.01); *H04N 1/00392* (2013.01); *H04W 4/80* (2018.02); *H04N 2201/0094* (2013.01)

(56) References Cited

U.S. PATENT DOCUMENTS

| | | |
|---|---|---|
| 2006/0087680 A1 | 4/2006 | Maeda |
| 2006/0132821 A1 | 6/2006 | Nonaka et al. |
| 2008/0074692 A1 | 3/2008 | Suzuki et al. |
| 2008/0186536 A1 | 8/2008 | Shimizu |
| 2009/0036056 A1 | 2/2009 | Oshima et al. |
| 2009/0066998 A1 | 3/2009 | Kato |
| 2009/0146796 A1 | 6/2009 | Goto et al. |
| 2010/0231958 A1 | 9/2010 | Okigami |
| 2010/0238002 A1 | 9/2010 | Ryan et al. |
| 2011/0026069 A1 | 2/2011 | Jesudason et al. |
| 2011/0292445 A1* | 12/2011 | Kato ............... G06F 3/1222 358/1.15 |
| 2011/0304436 A1 | 12/2011 | Negishi et al. |
| 2012/0021703 A1 | 1/2012 | Yamazaki et al. |
| 2012/0099566 A1 | 4/2012 | Laine et al. |
| 2012/0178367 A1* | 7/2012 | Matsumoto ........ G06K 19/0707 455/41.1 |

FOREIGN PATENT DOCUMENTS

| | | |
|---|---|---|
| CN | 101458761 A | 6/2009 |
| CN | 101834656 A | 9/2010 |
| CN | 102279933 A | 12/2011 |
| CN | 102356627 A | 2/2012 |
| JP | 11334180 | 12/1999 |
| JP | 2004030279 A | 1/2004 |
| JP | 2006120041 | 5/2006 |
| JP | 2007079639 A | 3/2007 |
| JP | 2008193265 | 8/2008 |
| JP | 2008283590 A | 11/2008 |
| JP | 2009147901 | 7/2009 |
| JP | 2010239351 A | 10/2010 |
| JP | 2010241114 | 10/2010 |
| JP | 2010273226 A | 12/2010 |
| JP | 2011034551 | 2/2011 |
| JP | 2011044092 | 3/2011 |

OTHER PUBLICATIONS

Japanese Office Action issued in corresponding Japanese Application No. 2017084016 dated Feb. 2, 2018.
Japanese Office Action issued in corresponding Japanese Application No. 2012-048624 dated Jan. 22, 2016.
Japanese Office Action issued in corresponding Japanese Application No. 2016-057551 dated Aug. 15, 2016.
Japanese Office Action issued in corresponding Japanese Application No. 2016-057551 dated Jan. 20, 2017.
Japanese Office Action issued in corresponding Japanese Application No. 2018150638 dated Apr. 15, 2019.

* cited by examiner

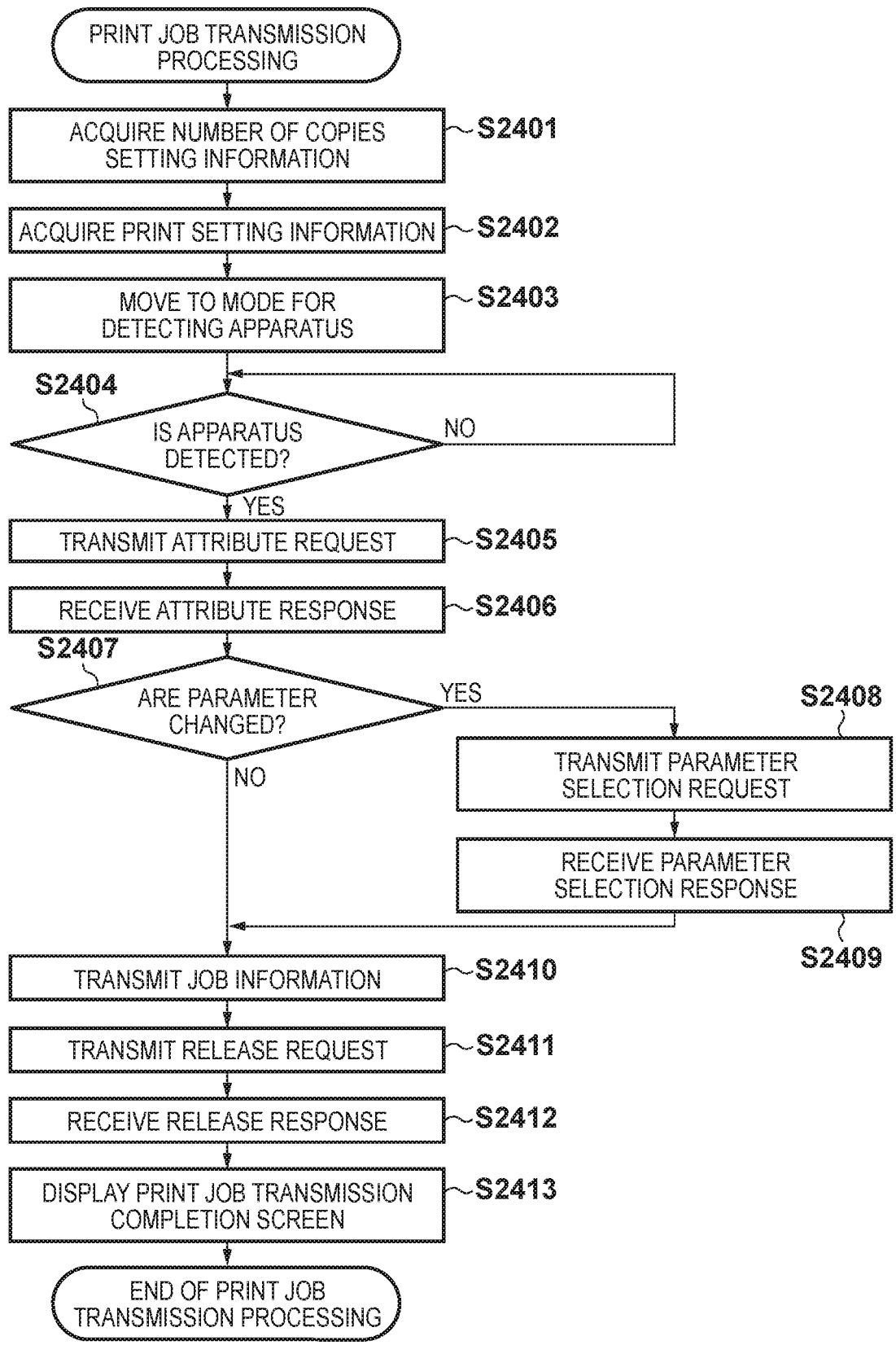

FIG. 25A 2501 2502

| ¥¥AAA.net¥picture¥0001.jpg | 1 |
| ¥¥BBB.net¥photo¥1234.jpg | 2 |
| ... | ... |

FIG. 25B 2511 2512 2513

| A4 | GLOSSY PAPER | EXCELLENT |

PROCESSING APPARATUS AND COMMUNICATION METHOD

CROSS REFERENCE TO RELATED APPLICATION

This application is a continuation of U.S. application Ser. No. 14/961,034, filed on Dec. 7, 2015, which is a division of U.S. application Ser. No. 14/617,211, filed on Feb. 9, 2015, which is a continuation of U.S. application Ser. No. 13/777,365 filed on Feb. 26, 2013, the entire disclosures of which are incorporated herein by reference.

BACKGROUND OF THE INVENTION

Field of the Invention

The present invention relates to a processing apparatus, and a communication method and, more particularly, to a processing apparatus capable of performing wireless communication, and a communication method.

Description of the Related Art

An information processing apparatus has the following states according to its operation state, and a state transition between the states occurs. That is, the apparatus has a hard-off state before the power such as an AC power source and battery is turned on, a soft-off state in which the power is turned on but a main program is not activated, a sleep state in which the main program is activated but the power consumption is controlled to be reduced, and a normal state in which a program is normally activated. There is well known, for example, an information processing apparatus such that when the apparatus is in the sleep state and receives a job from an external terminal, it is automatically activated. There is also disclosed a method in which if an information processing apparatus is in the hard-off state or soft-off state when it receives a job from an external terminal, job information to be input is stored in the external terminal. See, for example, Japanese Patent Laid-Open No. 2004-030279.

Assume that the information processing apparatus is a printer apparatus. In this case, the above-described conventional method has the following problem.

That is, if the printer apparatus is in a power-off state, it is impossible to store job information in the apparatus, and it is thus necessary to store the job information in an external apparatus which has requested a job. In other words, the external apparatus needs to transmit a job after detecting that the printer apparatus enters a normal state. Therefore, the external apparatus needs to maintain a state in which it can communicate with the printer apparatus, until the printer apparatus enters the normal state.

SUMMARY OF THE INVENTION

Accordingly, the present invention is conceived as a response to the above-described disadvantages of the conventional art.

For example, a processing apparatus, and a communication method according to one embodiment of this invention is capable of executing a job received from an external apparatus regardless of the state of a processing apparatus and the state of communication with the processing apparatus.

According to one aspect of the present invention, there is provided a processing apparatus comprising: a communication unit configured to communicate with a communication device to receive an instruction for causing the apparatus to execute a predetermined process from the communication device, wherein even though power is not supplied from a power supply, the communication unit be able to receive data from the communication device and store the data into a memory; a storage unit configured to store the instruction received by the communication unit into the memory; and an execution unit configured to, in a case where power has not been supplied from the power supply, and the instruction has been stored into the memory by the storage unit, when power is supplied to the apparatus from the power supply, execute the predetermined process based on the instruction.

According to another aspect of the present invention, there is provided a communication method applied to a processing apparatus including a communication unit comprising: communicating with a communication device to receive an instruction for causing the apparatus to execute a predetermined process from the communication device, wherein even though power is not supplied from a power supply to the apparatus, the communication unit is able to receive data from the communication device and store the data into a memory; storing the received instruction into the memory; and in a case where power has not been supplied from the power supply to the apparatus, and the instruction has been stored into the memory, when power is supplied to the apparatus from the power supply, executing the predetermined process based on the instruction.

According to still another aspect of the present invention, there is provided a non-transitory computer readable storage which stores a computer program to be executed in a processing apparatus including a communication unit. The program includes each step recited in the above-described method.

The embodiment according to the invention is particularly advantageous since a communication device can transmit an instruction via communication to a processing apparatus, and the processing apparatus stores the instruction for the processing apparatus even if the processing apparatus is in a power-off state. If, therefore, the processing apparatus returns from the power-off state to a normal state, it need not acquire instruction for the processing apparatus to execute a predetermined process from the communication device which has transmitted the instruction.

Further features of the present invention will become apparent from the following description of exemplary embodiments (with reference to the attached drawings).

BRIEF DESCRIPTION OF THE DRAWINGS

FIG. 24 is a flowchart illustrating print job transmission processing.

FIGS. 25A and 25B are views each showing an example of a data structure of print job transmission.

DESCRIPTION OF THE EMBODIMENTS

An exemplary embodiment of the present invention will now be described in detail in accordance with the accompanying drawings. It should be noted that the relative arrangement of components and the like set forth in the embodiment do not limit the scope of the present invention unless it is specifically stated otherwise.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

In the embodiment, a case in which after specifying a communication party and performing authentication by low-speed communication using a short distance wireless communication method, the communication is switched over to a high-speed communication to transmit image data will be described. More specifically, a method of performing, for a target, authentication by short distance wireless communication such as NFC (Near Field Communication) which does not require a power supply, and then switching the communication to another communication protocol to communicate image data will be explained.

Figure 1:
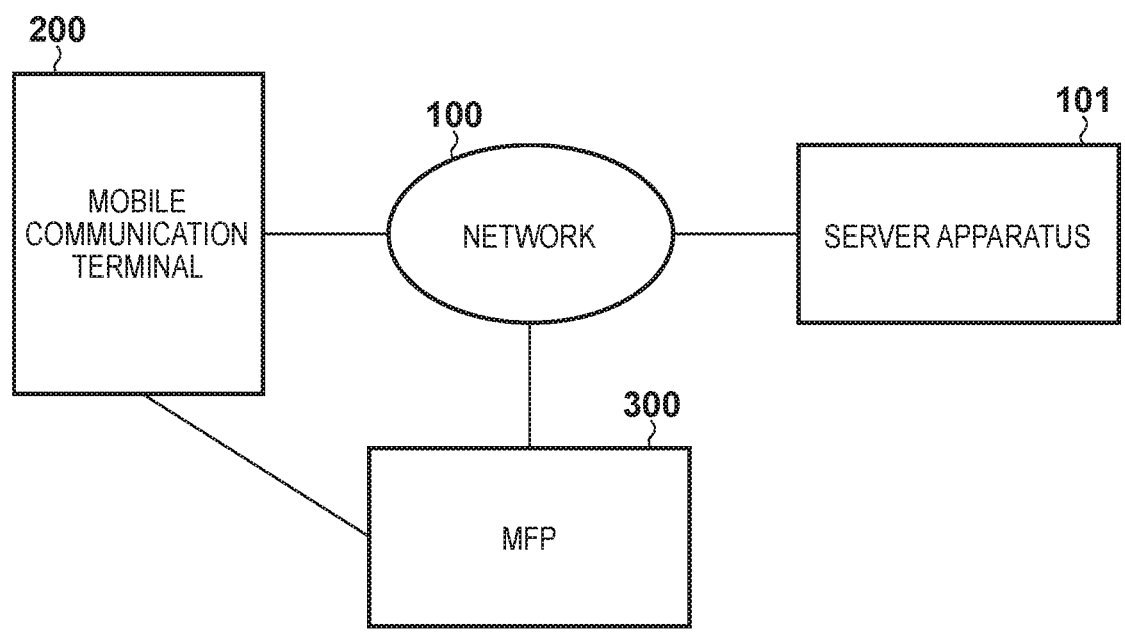
FIG. 1 is a block diagram showing the overall configuration of a print system capable of performing short distance wireless communication according to an exemplary embodiment of the present invention.

FIG. 1 is a block diagram showing the configuration of a network system using short distance wireless communication according to an exemplary embodiment of the present invention. The system has a basic configuration in which a server apparatus 101, a mobile communication terminal (information processing apparatus) 200, and a multi-function printer (to be referred to as an MFP or printing apparatus hereinafter) 300 are connected to each other via a network 100.

The server apparatus 101 includes a storage unit for image data to be printed, and a processor for managing user IDs and executing an image processing application. The mobile communication terminal 200 implements at least two types of wireless communication protocols with different authentication methods and different communication speeds. The mobile communication terminal need only be an apparatus capable of handling files of print targets, for example, a personal information terminal such as a PDA (Personal Digital Assistant), a mobile phone, a smart phone, or a digital camera. The MFP 300 is a multi-function printer including a display unit and operation panel through which various settings can be made, and having a printer function of using an inkjet printer or the like as a printer engine, a scanner function of reading an original placed on a document table, a FAX function, and a telephone function.

The network 100 and server apparatus 101 are connected by wired LAN, and the network 100 and MFP 300 are connected by wired LAN or wireless LAN (to be referred to as WLAN hereinafter). The network 100 and mobile communication terminal 200 are connected by WLAN. Since both the mobile communication terminal 200 and the MFP 300 have a WLAN function, they can perform peer to peer (to be referred to as P2P hereinafter) communication by authenticating each other.

Figure 2:
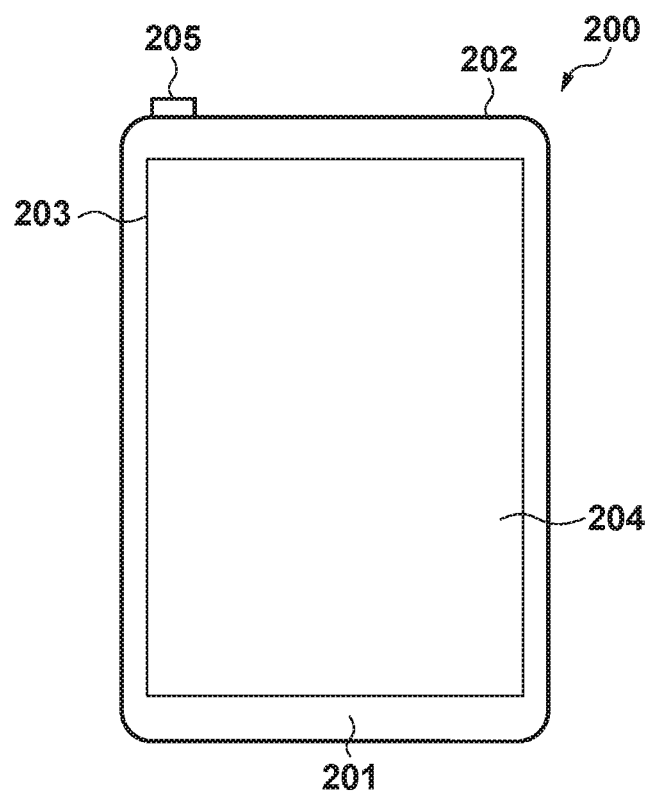
FIG. 2 is a front view showing a mobile communication terminal.

FIG. 2 is a front view showing the mobile communication terminal 200 such as a smart phone. The smart phone indicates a multi-function mobile phone including a camera, network browser, and mail function in addition to a mobile phone function.

Referring to FIG. 2, an NFC unit 201 performs communication using NFC. Actually, communication can be performed when the user moves the NFC unit 201 close to within about 10 cm of the NFC unit of the other communication party. A WLAN unit 202 is used to perform communication using WLAN, and is arranged within the terminal. Note that the coverage of WLAN is wider than that (about 10 cm) of NFC. A display unit 203 is formed from an LCD display on which an operation unit 204 with an electrostatic touch-panel operation mechanism is arranged. The operation unit 204 detects user operation information. As a typical operation method, the display unit 203 displays button-shaped menus, and when the user touches the operation unit 204, an event associated with the button portion is issued to execute processing. A power key 205 is used to turn on/off the power.

Figure 3A:
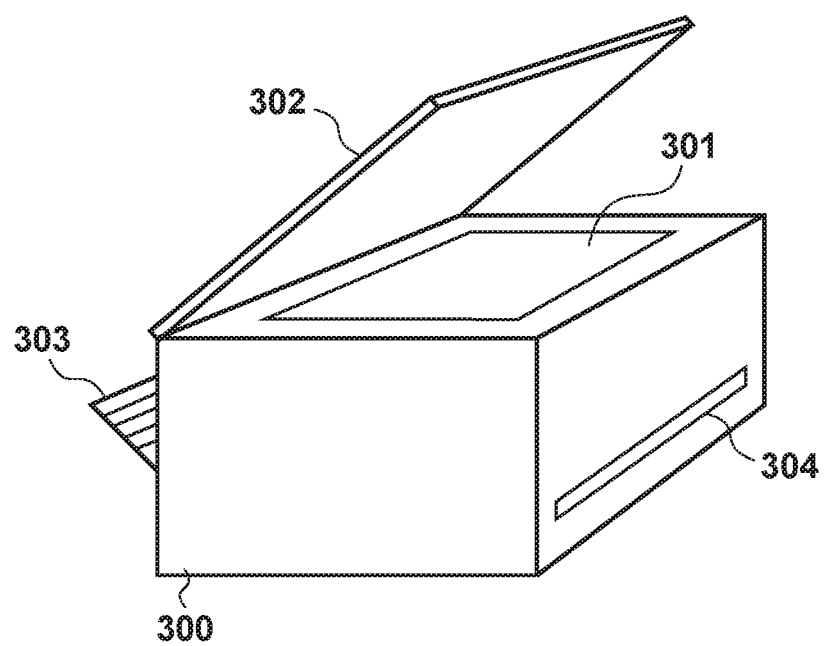
FIGS. 3A and 3B are views each schematically showing the outer appearance of an MFP apparatus.
Figure 3B:
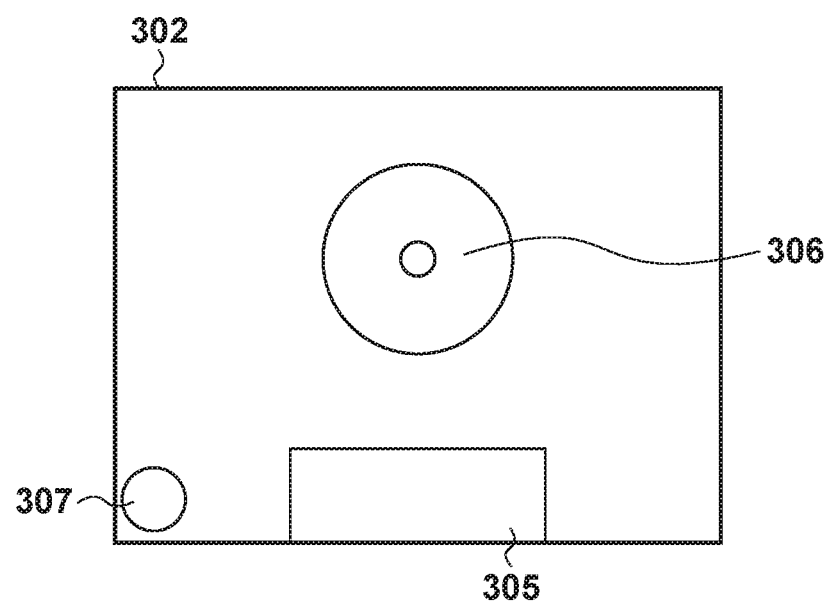

FIGS. 3A and 3B are views each schematically showing the outer appearance of the MFP 300. FIG. 3A is a perspective view showing the outer appearance and FIG. 3B is a plan view showing the MFP.

A document table 301 is a transparent glass table and is used to place an original to be read by the scanner. A document cover 302 is used to prevent reading light from externally leaking at the time of reading by the scanner. A printing paper insert port 303 is used to set paper sheets of various sizes. The paper sheets set in the printing paper insert port 303 are conveyed to a printing unit (printer engine) one by one, undergo desired printing, and are discharged from a printing paper discharge port 304.

As shown in FIG. 3B, an operation display unit 305 and an NFC unit 306 are arranged on the document cover 302. The operation display unit 305 includes keys for various operations and an LCD display, with which it is possible to perform an operation and make settings for the MFP 300. The NFC unit 306 is a unit used to perform short distance wireless communication, and the NFC unit is a place, close to which the user actually moves the mobile communication terminal 200. An effective communicable distance is about 10 cm from the NFC unit 306. A WLAN antenna 307 is used for WLAN communication, and is embedded in the document cover 302.

The NFC unit is used for low-speed communication, and the WLAN unit is used for high-speed communication.

NFC communication will be described next. For near field communication using an NFC unit, an apparatus which generates an RF (Radio Frequency) field (magnetic field) to start communication will be referred to as an initiator hereinafter. An apparatus which communicates with the initiator in response to an instruction sent by the initiator will be referred to as a target hereinafter. The communication modes of the NFC unit include a passive mode and active mode. In the passive mode, the target responds to an instruction sent by the initiator by performing load modulation. On the other hand, in the active mode, the target responds to an instruction sent by the initiator with an RF field generated by the target itself.

Figure 4A:
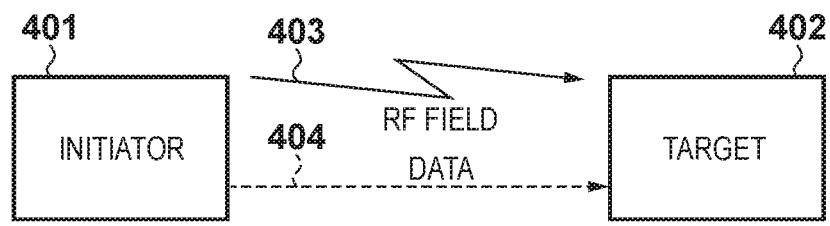
FIGS. 4A and 4B are block diagrams showing the concept of a passive mode in NFC communication.
Figure 4B:
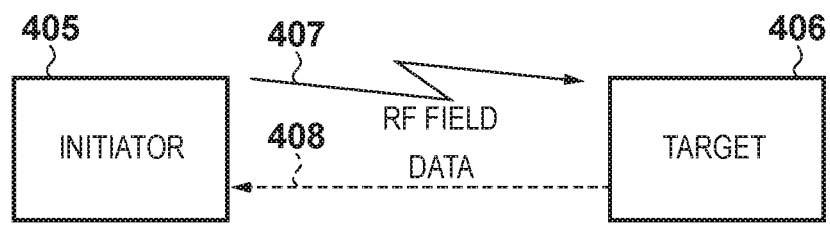

FIGS. 4A and 4B are block diagrams showing the concept of the passive mode in NFC communication.

FIG. 4A shows a case in which an initiator 401 transmits data 404 to a target 402 in the passive mode. The initiator 401 generates an RF field (magnetic field) 403. The initiator 401 modulates the RF field 403 to transmit the data 404 to the target 402. FIG. 4B shows a case in which a target 406 transfers data 408 to an initiator 405 in the passive mode. Similarly to FIG. 4A, the initiator 405 generates an RF field 407. The target 406 performs load modulation for the RF field 407 to transmit the data 408 to the initiator 405.

Figure 5A:
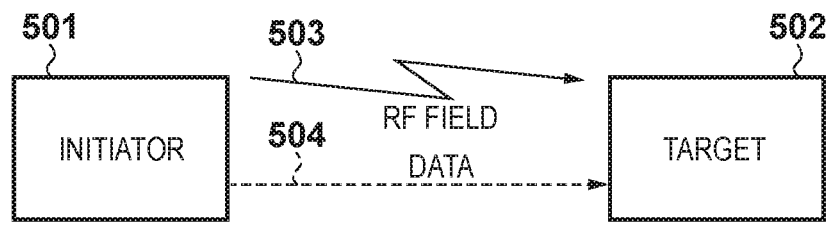
FIGS. 5A and 5B are block diagrams showing the concept of an active mode in NFC communication.
Figure 5B:
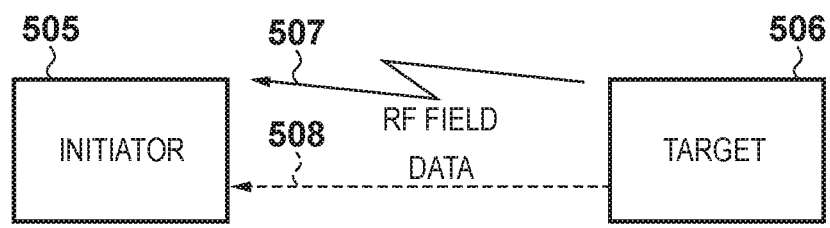

FIGS. 5A and 5B are block diagrams showing the concept of the active mode in NFC communication.

FIG. 5A shows a case in which an initiator 501 transmits data 504 to a target 502 in the active mode. The initiator 501 generates an RF field 503. The initiator 501 modulates the RF field 503 to transmit the data 504 to the target 502. Upon completion of the data transmission, the initiator 501 stops generating the RF field 503. FIG. 5B shows a case in which a target 506 transmits data 508 to an initiator 505 in the active mode. The target 506 generates an RF field 507. The target 506 transmits the data 508 with the RF field 507 generated by itself. Upon completion of the data transmission, the target 506 stops generating the RF field 507.

Figure 6:
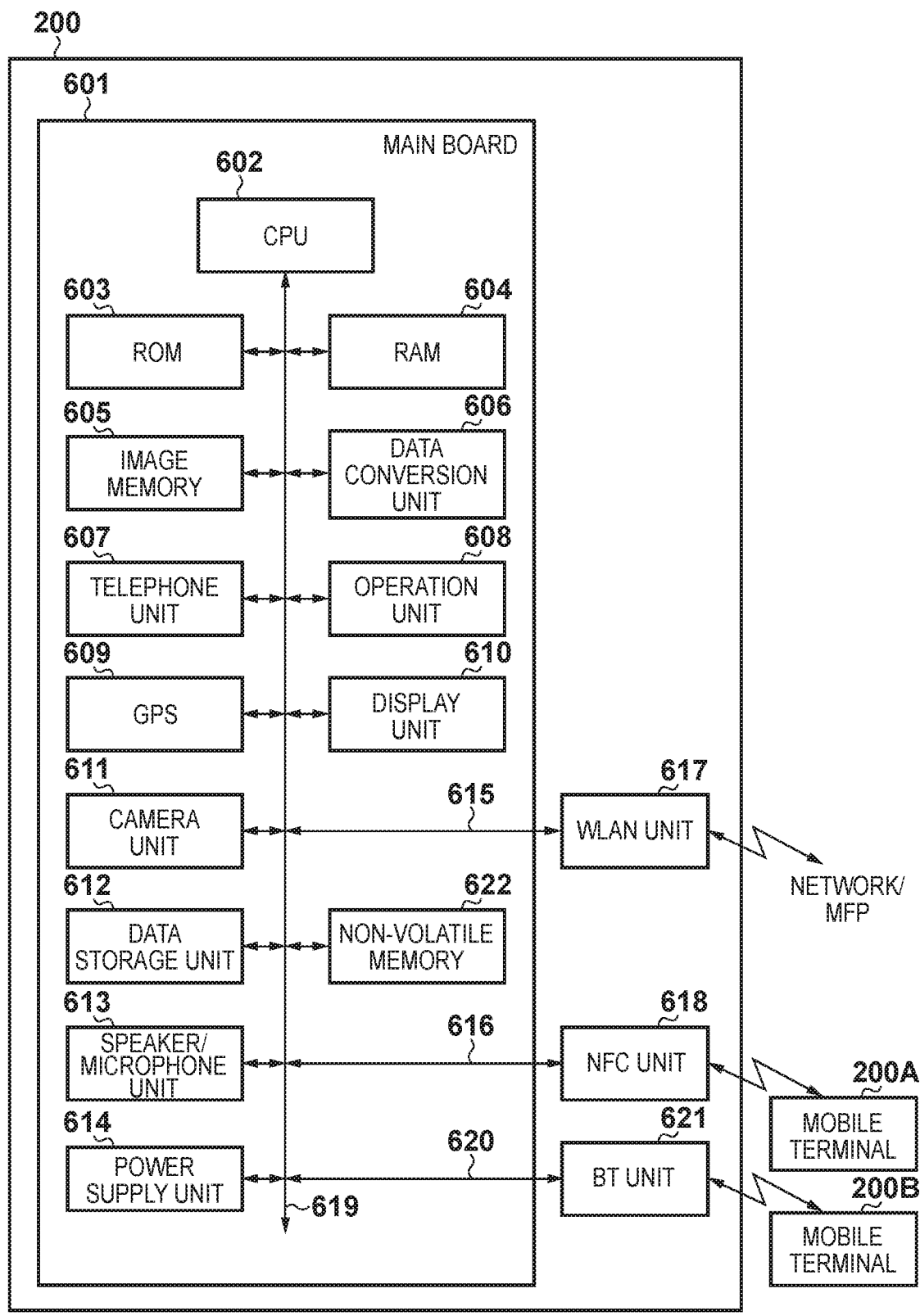
FIG. 6 is a block diagram showing the arrangement of a mobile communication terminal 200.

FIG. 6 is a block diagram showing the arrangement of the mobile communication terminal 200.

The mobile communication terminal 200 includes a main board 601 for controlling the apparatus as a whole, a WLAN unit 617 for performing WLAN communication, an NFC unit 618 for performing NFC communication, and a BT unit 621 for performing BT communication using Bluetooth®. Note that although FIG. 6 shows a mobile communication terminal as the communication party of the NFC unit 618 or BT unit 621, the communication party is not limited to this. For example, the NFC unit or BT unit can communicate with any apparatus implementing the same communication protocol, as a matter of course. Furthermore, a WLAN unit may be arranged instead of the BT unit 621 to perform high-speed wireless communication using a protocol conforming to, for example, IEEE802.1X or IEEE802.11n. The WLAN unit 617, NFC unit 618, and BT unit 621 will be collectively referred to as a communication unit hereinafter.

A CPU 602 of the main board 601 serves as a system control unit for controlling the mobile communication terminal 200 as a whole. A ROM 603 stores control programs, an embedded operating system (OS) program, and the like to be executed by the CPU 602. In this embodiment, each control program stored in the ROM 603 performs software control such as scheduling or task switching under the management of the embedded OS stored in the ROM 603. A RAM 604 is formed from an SRAM or the like. The RAM 604 stores program control variables, setting values registered by the user, management data for the mobile communication terminal 200, and the like, and also is used as various work buffer areas.

An image memory 605 is formed from a DRAM or the like, and temporarily stores image data received via the communication unit or image data read out from a data storage unit 612 for processing by the CPU 602. A non-volatile memory 622 is formed from a flash memory or the like, and stores data to be saved even after power-off. Examples of the data are telephone directory data and information of devices connected in the past. Note that the memory structure is not limited to that shown in FIG. 6. The image memory 605 and RAM 604 may share a memory, or data may be backed up in the data storage unit 612. Although the DRAM is used in this embodiment, the present invention is not limited to this, and a hard disk, a non-volatile memory, or the like may be used.

A data conversion unit 606 performs analysis of a page description language (PDL) and the like, and data conversion such as color conversion and image conversion. A telephone unit 607 controls a telephone line, and processes voice data input/output through a speaker/microphone unit 613, thereby implementing communication by telephone. An operation unit 608 controls a signal generated by the operation unit 204 described with reference to FIG. 2. A GPS (Global Positioning System) 609 acquires the current latitude and longitude. A display unit 610 electronically controls display contents of the display unit 203 described with reference to FIG. 2, and can display various input operations, the operation state and status of the MFP 300, and the like.

A camera unit 611 has a function of electronically recording and encoding an image input via a lens. An image captured by the camera unit 611 is saved in the data storage unit 612. The speaker/microphone unit 613 implements a function of inputting or outputting voice for the telephone function, an alarm notification function, and the like. A power supply unit 614 includes a portable battery, and controls the power supply. Power supply states include a battery empty state corresponding to a zero battery level, a power off state before the user presses the power key 205, an active state (power-on state) in which the apparatus is normally activated, and a power-saving state in which the apparatus is activated but in a power-saving mode.

The mobile communication terminal 200 integrates three (3) wireless communication units as communication units for performing data communication with another device such as an MFP, and can perform wireless communication by WLAN, NFC, and Bluetooth®. The communication unit converts data into a packet, and transmits the packet to another device such as mobile terminals 200A, 200B. The communication unit also converts a packet from another external device into data, and transmits the converted data to the main board 601. The WLAN unit 617, NFC unit 618, and BT unit 621 are connected by bus cables 615, 616, and 620, respectively. The WLAN unit 617, NFC unit 618, and BT unit 621 implement communication conforming to the respective specifications. The NFC unit will be described in detail later.

The above-described components 603 to 614, 617, 618, 621, and 622 are connected to each other via a system bus 619 managed by the CPU 602.

Figure 7:
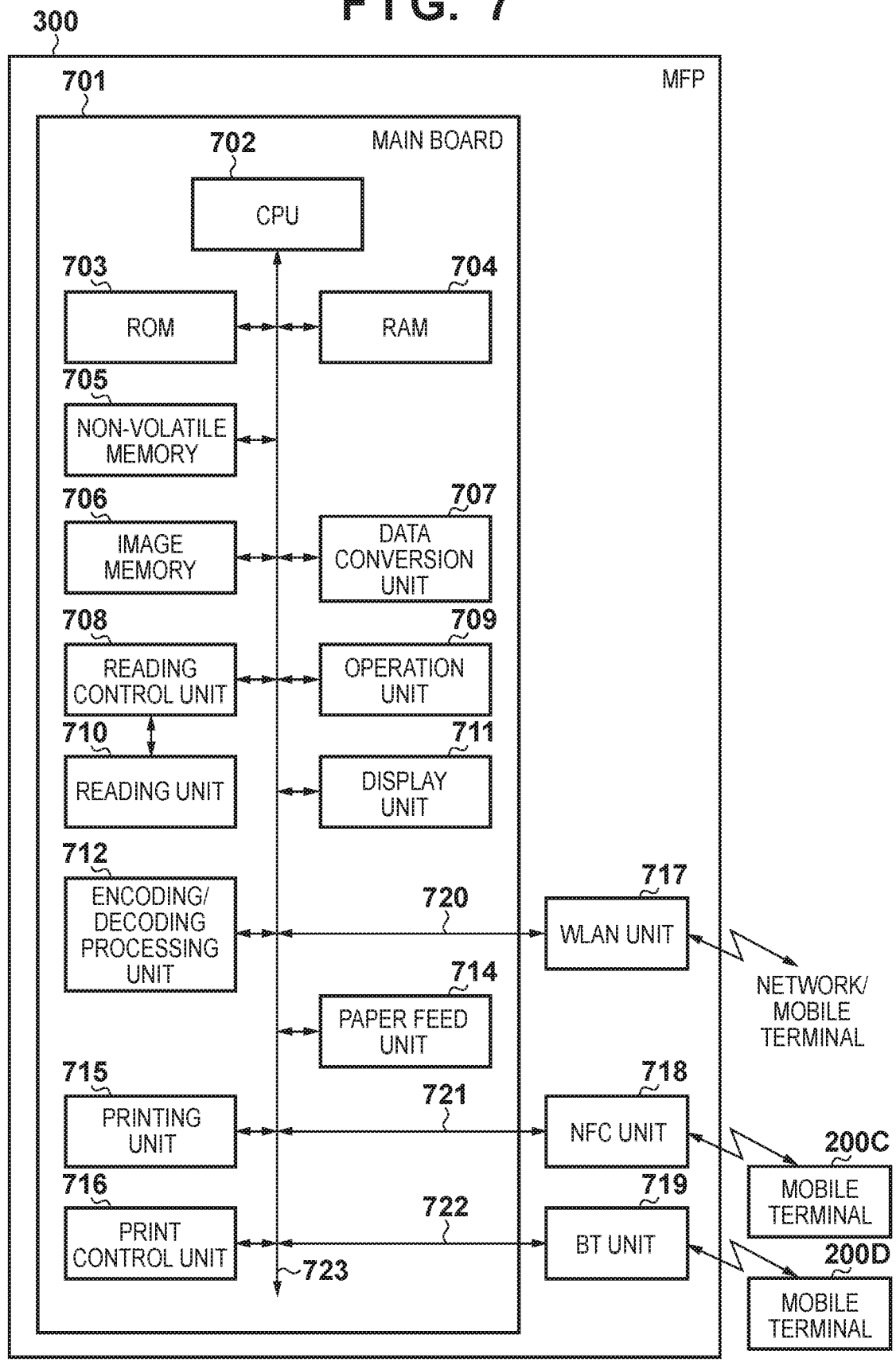
FIG. 7 is a block diagram showing the schematic arrangement of an MFP 300.

FIG. 7 is a block diagram showing the schematic arrangement of the MFP 300.

The MFP 300 includes a main board 701 for controlling the apparatus as a whole, a WLAN unit 717 for performing WLAN communication, an NFC unit 718 for performing NFC communication, and a BT unit 719 for performing BT communication. Note that although FIG. 7 shows mobile communication terminals 200C, 200D as the communication party of the NFC unit 718 or BT unit 719, the communication party is not limited to this. For example, the NFC unit or BT unit can communicate with any apparatus implementing the same communication protocol, as a matter of course. Furthermore, a WLAN unit may be arranged instead of the BT unit 719 to perform high-speed wireless communication using a protocol conforming to, for example, IEEE802.1X or IEEE802.11n. The WLAN unit 717, NFC unit 718, and BT unit 719 will be collectively referred to as a communication unit hereinafter.

A CPU 702 of the main board 701 serves as a system control unit for controlling the MFP 300 as a whole. A ROM 703 stores control programs, an embedded operating system (OS) program, and the like to be executed by the CPU 702. In this embodiment, each control program stored in the ROM 703 performs software control such as scheduling or task switching under the management of the embedded OS stored in the ROM 703.

A RAM 704 is formed from an SRAM or the like. The RAM 704 stores program control variables, setting values registered by the user, management data for the MFP 300, and the like, and also is used as various work buffer areas. A non-volatile memory 705 is formed from a flash memory or the like, and stores data to be saved even after power-off. More specifically, the non-volatile memory 705 stores network connection information, user data, and the like. An image memory 706 is formed from a DRAM or the like, and stores image data received via the communication unit, image data processed by an encoding/decoding processing unit 712, and image data acquired from a memory card via a memory card controller (not shown). Like the memory structure of the mobile communication terminal 200, the memory structure is not limited to this. A data conversion unit 707, for example, performs analysis of page description language (PDL) data and the like, and conversion of image data into print data.

An image signal generated when a reading unit 710 controlled by a reading control unit 708 causes a CIS image sensor to optically read an original undergoes various image processes such as binarization processing and half-toning processing via an image processing control unit (not shown), thereby outputting high-resolution image data.

An operation unit 709 and a display unit 711 represent the operation display unit 305 described with reference to FIG. 4. The encoding/decoding processing unit 712 executes encoding/decoding processing and resizing processing for the image data (JPEG, PNG, or the like) handled by the MFP 300.

A paper feed unit 714 holds printing media such as printing paper sheets. The paper feed unit 714 can perform a paper feed operation under the control of a print control unit 716. Especially, the paper feed unit may include a plurality of paper feed units to hold a plurality of kinds of printing paper sheets in one apparatus. In this case, the print control unit 716 controls to select a paper feed unit to feed printing paper sheets.

The print control unit 716 converts image data to be printed into high-resolution image data by executing, via the image processing control unit (not shown), various image processes such as smoothing processing, printing density correction processing, and color correction, and outputs the obtained image data to a printing unit 715. The print control unit 716 periodically reads out information in the printing unit 715 to update status information stored in the RAM 704. More specifically, the print control unit 716 updates the ink residual of an ink tank, the state of a printhead, and like.

Similarly to the mobile communication terminal 200, the MFP 300 integrates three (3) wireless communication units. Each function is the same as that of the mobile communication terminal 200, and a description thereof will be omitted. Note that the WLAN unit 717, NFC unit 718, and BT unit 719 are connected by bus cables 720, 721, and 722, respectively.

The above-described components 702 to 719 are connected to each other via a system bus 723 managed by the CPU 702.

The WLAN unit shown in FIGS. 6 and 7 can perform high-speed wireless communication conforming to, for example, IEEE802.1X or IEEE802.11n.

Figure 8:
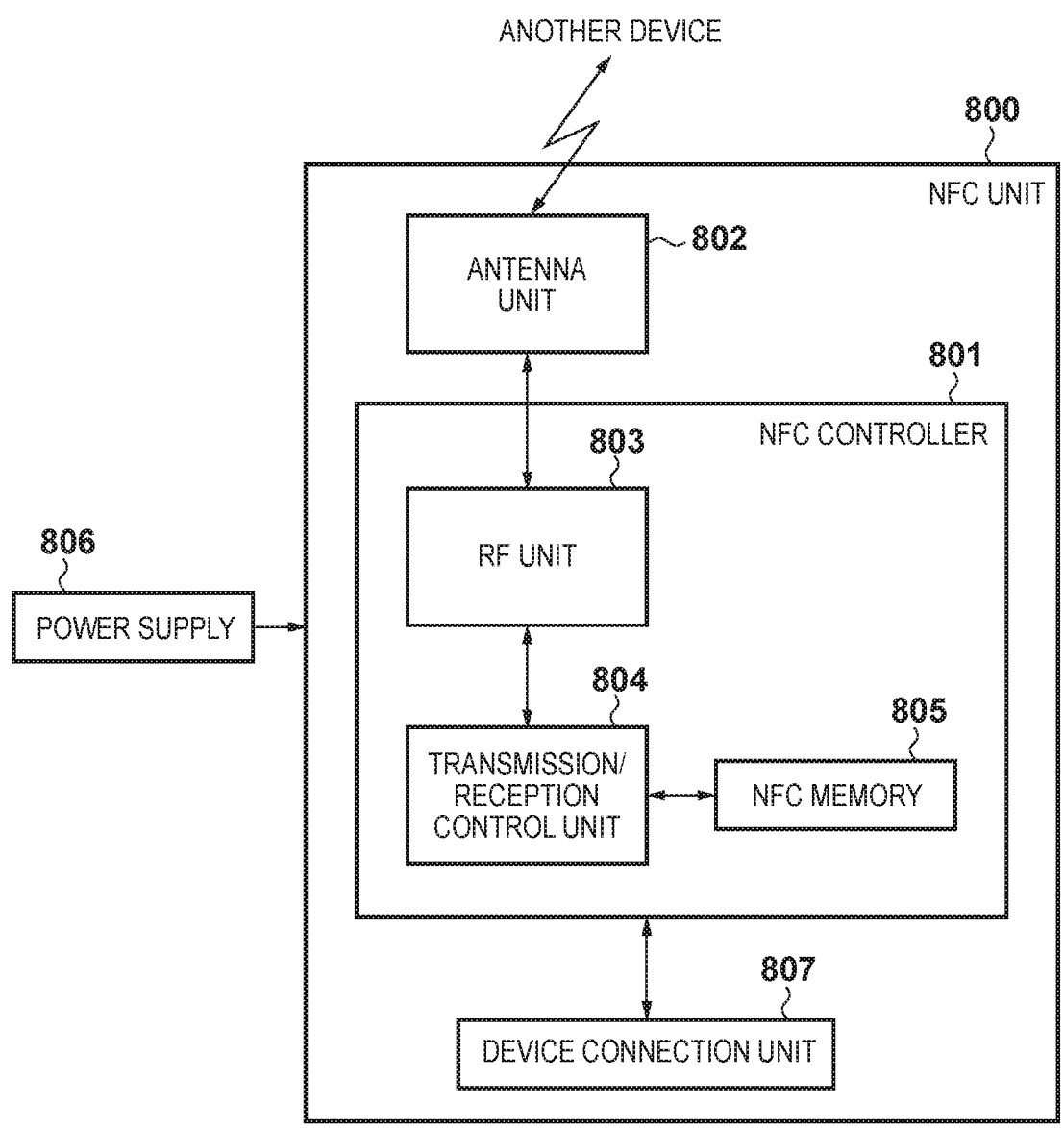
FIG. 8 is a block diagram showing the detailed arrangement of an NFC unit.

FIG. 8 is a block diagram showing the detailed arrangement of the NFC unit used as the NFC unit 618 or NFC unit 718.

An NFC unit 800 includes an NFC controller 801, an antenna unit 802, an RF unit 803, a transmission/reception control unit 804, an NFC memory 805, and a device connection unit 807. A power supply 806 is provided outside the NFC unit 800. The antenna unit 802 receives/transmits a radio wave or a carrier from/to another NFC device. The RF unit 803 has a function of modulating/demodulating an analog signal into/from digital signal. The RF unit 803 includes a synthesizer to identify the frequency of a band or a channel and control the band or channel using frequency assignment data. The transmission/reception control unit 804 performs control concerning transmission/reception, including assembling and disassembling of a transmission/reception frame, preamble addition and detection, and frame identification. The transmission/reception control unit 804 also controls the NFC memory 805 to input/output various data and programs.

The NFC memory 805 is formed from a non-volatile memory. When the NFC unit operates in the active mode, it receives power via the power supply 806, and communicates with another device via the device connection unit 807 or communicates with another NFC device existing within coverage by a carrier transmitted/received via the NFC controller 801. To the contrary, when the NFC unit operates in the passive mode, it receives a radio wave from another NFC device via the antenna unit 802, and receives power from the other NFC device by electromagnetic induction. The NFC unit then communicates with the other NFC device by modulating the carrier, thereby transmitting/receiving data including information stored in the NFC memory 805.

Figure 9:
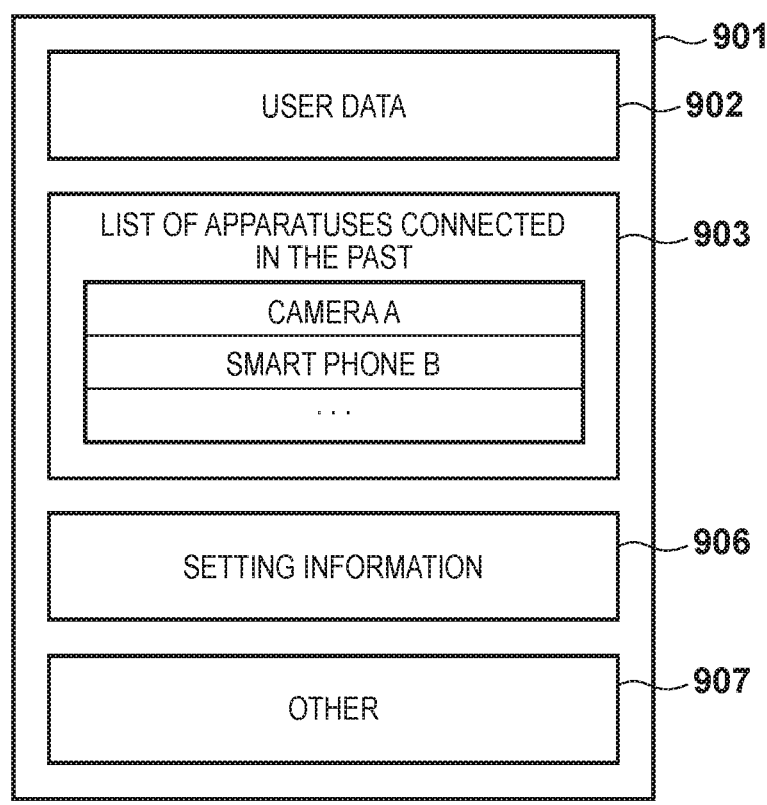
FIG. 9 is a block diagram showing the internal structure of the non-volatile memory (flash memory) of the MFP.

FIG. 9 is a block diagram showing the internal structure of the non-volatile memory (flash memory) 705 of the MFP 300.

Referring to FIG. 9, reference numeral 901 denotes an entire flash memory. User data 902 stores information about the user, including a FAX number, a communication history, and network information. A list 903 of apparatuses connected in the past stores a list of apparatuses to which the MFP 300 has been connected so far. If, for example, the MFP 300 communicated with a smart phone using NFC, the identifier of the smart phone is stored. If P2P communication with a smart phone was performed via WLAN, identification information for WLAN connection is stored. More specifically, if WPS (Wi-Fi Protected Setup) is used for WLAN connection, WPS Credential authentication information is stored.

If the MFP 300 was connected to a smart phone by Bluetooth®, OOB authentication information is stored. If the MFP 300 was connected to the server apparatus 101 via the network 100, the network information of the server apparatus 101 is stored. Setting information 906 stores the setting information of the MFP 300. For example, menu items such as a print mode, correction information of an inkjet printhead, and the like are stored. Other 907 stores another non-volatile information.

Figure 10:
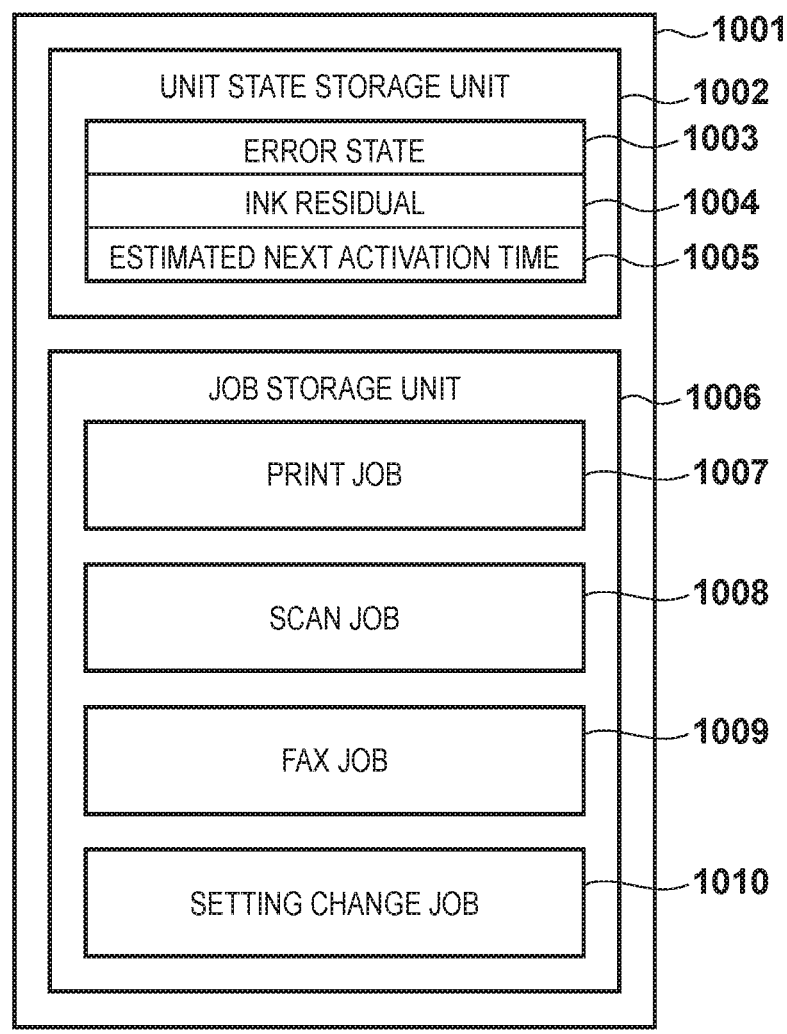
FIG. 10 is a block diagram showing the structure of an NFC memory 805 of the MFP 300.

FIG. 10 is a block diagram showing the structure of the NFC memory 805 of the MFP 300. Even if no power is supplied to the MFP 300, the NFC memory 805 can, for example, transmit/receive information to/from an external terminal such as the mobile communication terminal 200 and perform read/write operations using communication in the passive mode.

Referring to FIG. 10, reference numeral 1001 denotes an entire NFC memory. The CPU 702 copies, to a unit state storage unit 1002, the contents (an error state 1003, an ink residual 1004, and an estimated next activation time 1005) of the unit state storage unit which are set in the RAM 704 at a predetermined timing.

A job storage unit 1006 serves as an area to be used when the mobile communication terminal 200 inputs a job to the MFP 300 by NFC. A print job 1007 stores a queue of print jobs. More specifically, the print job 1007 stores print settings and links to image data. A scan job 1008 stores a queue of scan jobs. More specifically, the scan job 1008 stores read settings and the save destinations of read data. A FAX job 1009 stores a queue of FAX jobs. More specifically, the FAX job 1009 stores FAX settings including a communication image quality and the telephone number of a transmission destination, and links to images if the images have already been read. A setting change job 1010 stores a queue of setting change jobs. More specifically, the setting change job 1010 stores jobs associated with changing of the setting items of the MFP main body.

Figure 11:
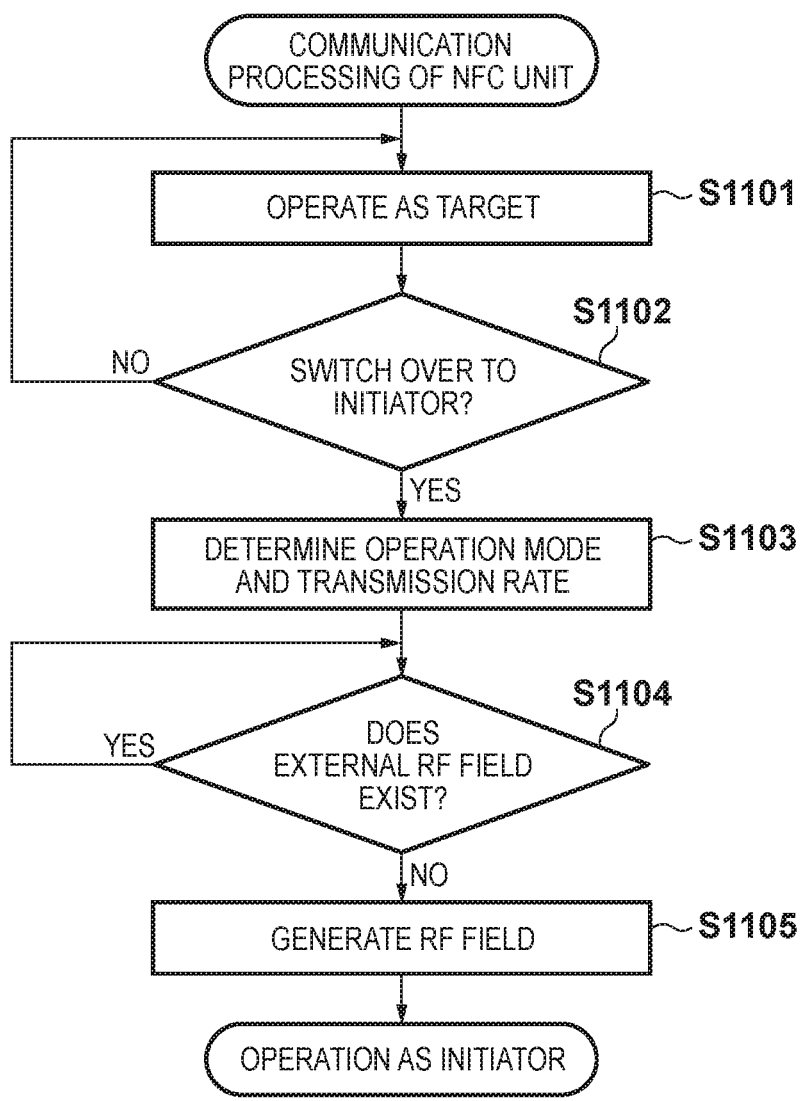
FIG. 11 is a flowchart for causing the NFC unit to operate as an initiator.

FIG. 11 is a flowchart when the NFC unit operates as an initiator.

In step S1101, every NFC unit operates as a target, and stands by for an instruction from an initiator. In step S1102, the NFC unit can switch over to an initiator in response to a request from an application for controlling communication conforming to the NFC specifications. If the NFC unit responds to the request to switch over to an initiator, the process advances to step S1103 in which the application selects one of the active mode and the passive mode, and determines the transmission rate.

In step S1104, the initiator detects the existence of an RF field output from an apparatus other than itself. If an external RF field exists, the initiator does not generate the RF field of its own; otherwise, the process advances to step S1105 in which the initiator generates the RF field of its own.

By executing the above steps, the NFC unit starts the operation as the initiator.

Figure 12:
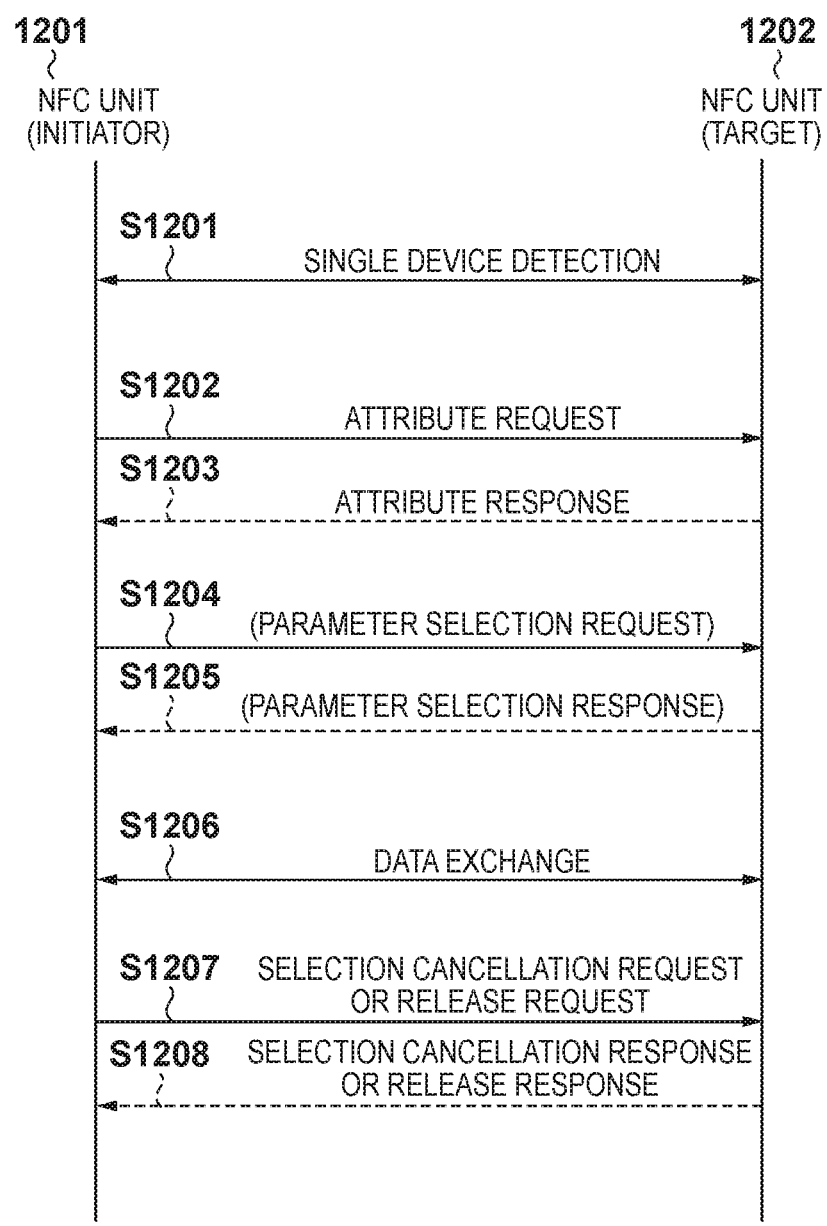
FIG. 12 is a sequence chart showing the sequence of performing data exchange in the passive mode.

FIG. 12 is a sequence chart showing the sequence of performing data exchange in the passive mode. A case will be described in which an NFC unit (first NFC unit) 1201 operates as an initiator and an NFC unit (second NFC unit) 1202 operates as a target.

In step S1201, the NFC unit 1201 performs single device detection to specify the NFC unit 1202. In step S1202, the NFC unit 1201 transmits, as an attribute request, the identifier of its own, the bit transmission rate of transmission/reception, the effective data length, and the like. This attribute request has general purpose bytes which can be arbitrarily selected and used. Upon receiving an effective attribute request, the NFC unit 1202 transmits an attribute response in step S1203. Note that transmission from the NFC unit 1202 is performed by load modulation, and data transmission by load modulation is represented by a dotted arrow in FIG. 12.

Upon confirming an effective attribute response, the NFC unit 1201 can transmit a parameter selection request, and change the parameters of a subsequent transmission protocol in step S1204. Parameters included in the parameter selection request are the transmission rate and effective data length. Upon receiving an effective parameter selection request, the NFC unit 1202 transmits a parameter selection response, and changes the parameters in step S1205. Note that steps S1204 and S1205 may be omitted if the parameters are not changed.

In step S1206, the NFC unit 1201 and the NFC unit 1202 exchange data by sending a data exchange request and a data exchange response. With the data exchange request and response, it is possible to transmit, as data, information for an application of the communication party. If the data size is large, the data can be divided and transmitted.

Upon completion of the data exchange, the NFC unit 1201 transmits one of a selection cancellation request and a release request in step S1207. If the NFC unit 1201 transmits the selection cancellation request, the NFC unit 1202 transmits a selection cancellation response in step S1208. Upon receiving the selection cancellation response, the NFC unit 1201 releases the attributes indicating the NFC unit 1202, and the process returns to step S1201. On the other hand, if the NFC unit 1201 transmits the release request, the NFC unit 1202 transmits a release response to return to the initial state in step S1208. Upon receiving the release response, the NFC unit 1201 can return to the initial state since the target has been completely released.

Figure 13:
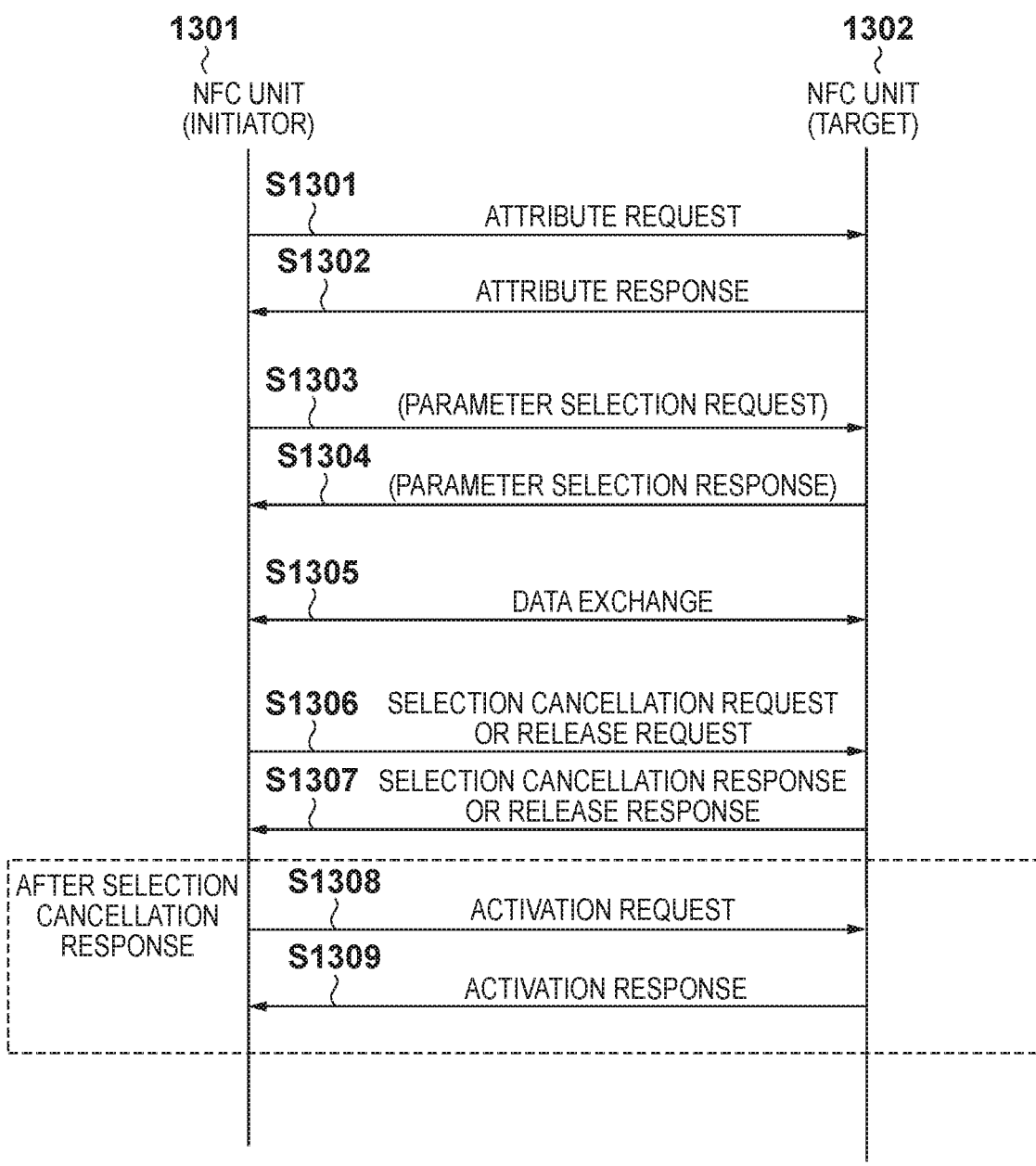
FIG. 13 is a sequence chart showing the sequence of performing data exchange in the active mode.

FIG. 13 is a sequence chart showing the sequence of performing data exchange in the active mode. A case will be described in which an NFC unit (first NFC unit) 1301 operates as an initiator and an NFC unit (second NFC unit) 1302 operates as a target.

In step S1301, the NFC unit 1301 transmits, as an attribute request, the identifier of its own, the bit transmission rate of transmission/reception, the effective data length, and the like. Upon receiving an effective attribute request, the NFC unit 1302 transmits an attribute response in step S1302. Note that transmission from the NFC unit 1302 is performed by an RF field generated by itself. Upon completion of data transmission, therefore, both the NFC units stop generating RF fields.

Upon confirming an effective attribute response, the NFC unit 1301 can transmit a parameter selection request, and change the parameters of a transmission protocol in step S1303. Parameters included in the parameter selection request are the transmission rate and effective data length. Upon receiving an effective parameter selection request, the NFC unit 1302 transmits a parameter selection response, and changes the parameters in step S1304. Note that similarly to the passive mode, steps S1303 and S1304 may be omitted if the parameters are not to be changed.

In step S1305, the NFC unit 1301 and the NFC unit 1302 exchange data by sending a data exchange request and a data exchange response. With the data exchange request and response, it is possible to transmit, as data, information for an application. If the data size is large, the data can be divided and transmitted.

Upon completion of the data exchange, the NFC unit 1301 transmits one of a selection cancellation request and a release request in step S1306. If the NFC unit 1301 transmits the selection cancellation request, the NFC unit 1302 transmits a selection cancellation response in step S1307. Upon receiving the selection cancellation response, the NFC unit 1301 releases the attributes indicating the NFC unit 1302. After that, the NFC unit 1301 transmits an activation request to another target with a known identifier in step S1308. Upon receiving the activation request, the target transmits an activation response in step S1309, and the process returns to step S1301. On the other hand, if the NFC unit 1301 transmits the release request, the NFC unit 1302 transmits a release response, and returns to the initial state in step S1309. Upon receiving the release response, the NFC unit 1301 can return to the initial state since the target has been completely released.

The communication rate of NFC is relatively as low as several hundred bps. Therefore, authentication and the like are performed using NFC, and a large amount of data is transmitted using higher-speed WLAN, thereby achieving efficient data transfer.

Figure 14:
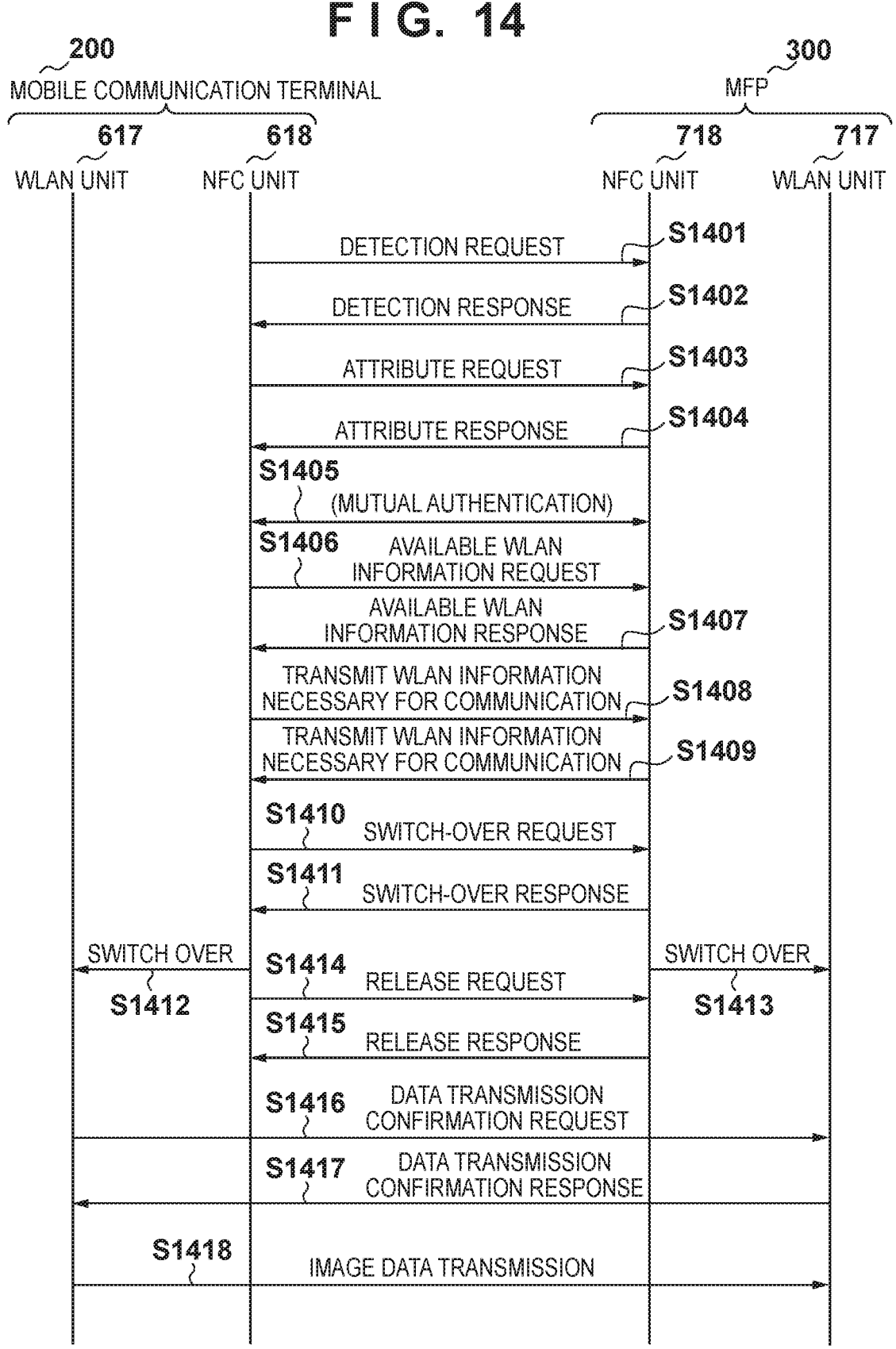
FIG. 14 is a sequence chart showing the sequence of performing push-type communication in which the mobile communication terminal takes initiative for transferring image data existing in itself to the MFP.

FIG. 14 is a sequence chart showing the sequence of transferring data by switching over between NFC and WLAN. FIG. 14 shows an example of so-called push-type communication in which the mobile communication terminal 200 takes initiative for transferring image data existing in itself to the MFP 300 to print it.

In step S1401, to establish NFC communication with the MFP 300, the NFC unit 618 serves as an initiator to detect the NFC unit 718 as a target. If the NFC unit 718 has been correctly detected, the NFC unit 718 transmits a detection response in step S1402. Note that in the example shown in FIG. 14, the mobile communication terminal 200 serves as an initiator. In fact, however, the MFP 300 may become an initiator based on an input through the operation display unit 305 or the like. Upon correctly receiving the detection response, in step S1403 the NFC unit 618 transmits an attribute request for performing NFC communication. Upon receiving the attribute request, the NFC unit 718 returns an attribute response in step S1404. With the attribute request and response, the NFC_IDs of the initiator and target are transmitted, and the communication parties are specified by the NFC_IDs.

In step S1405, mutual authentication is performed, thereby enabling to pass an encryption key for data encryption. Note that if, for example, it is not necessary to pass an encryption key, this mutual authentication need not be performed. In step S1406, the NFC unit 618 requests information about a communication protocol available in the MFP 300, to the NFC unit 718. This request contains information about a communication protocol available in the mobile communication terminal. Upon receiving the request, the NFC unit 718 can recognize that the mobile communication terminal can use WLAN communication. In step S1407, the NFC unit 718 responds to the request received in step S1406 with the information about the communication protocol available in itself. Both the apparatuses, therefore, can identify the communication protocol available with each other.

Assume that the mobile communication terminal serving as the initiator has determined that it is possible to perform data transfer at speed using the recognized WLAN communication protocol higher than that with NFC, and thus communication is performed by switching over to WLAN. Note that the MFP may determine switch-over to WLAN.

In this case, in steps S1408 and S1409, for example, the apparatuses exchange information necessary for WLAN communication, such as addresses for specifying the communication parties. The process then advances to step S1410, in which the NFC unit 618 transmits a request to switch over from the NFC communication to the WLAN communication. Upon receiving the switch-over request, the NFC unit 718 responds to it in step S1411.

Upon receiving a correct switch-over response, the NFC unit 618 is switched over to the WLAN unit 617 in step S1412, and the NFC unit 718 is switched over to the WLAN unit 717 in step S1413. After the switch-over operations, the NFC unit 618 transmits a release request in step S1414. Upon receiving the release request, the NFC unit 718 transmits a release response in step S1415, thereby terminating NFC communication.

Processing in step S1416 and subsequent steps executes WLAN communication based on the information for WLAN communication exchanged in steps S1408 and S1409.

In step S1416, the WLAN unit 617 confirms with the WLAN unit 717 whether or not data transfer is possible. The contents to be confirmed here include, for example, the capacity of free space to save image data to be transferred to the MFP 300. Upon receiving the confirmation request, the WLAN unit 717 transmits an acknowledgement in step S1417. If a correct acknowledgement has been received, and it has been determined that data transfer is possible, the WLAN unit 617 transmits image data existing in the mobile communication terminal 200 to the WLAN unit 717 in step S1418. This processing enables to transfer a large amount of data using a higher-speed communication protocol.

Figure 15:
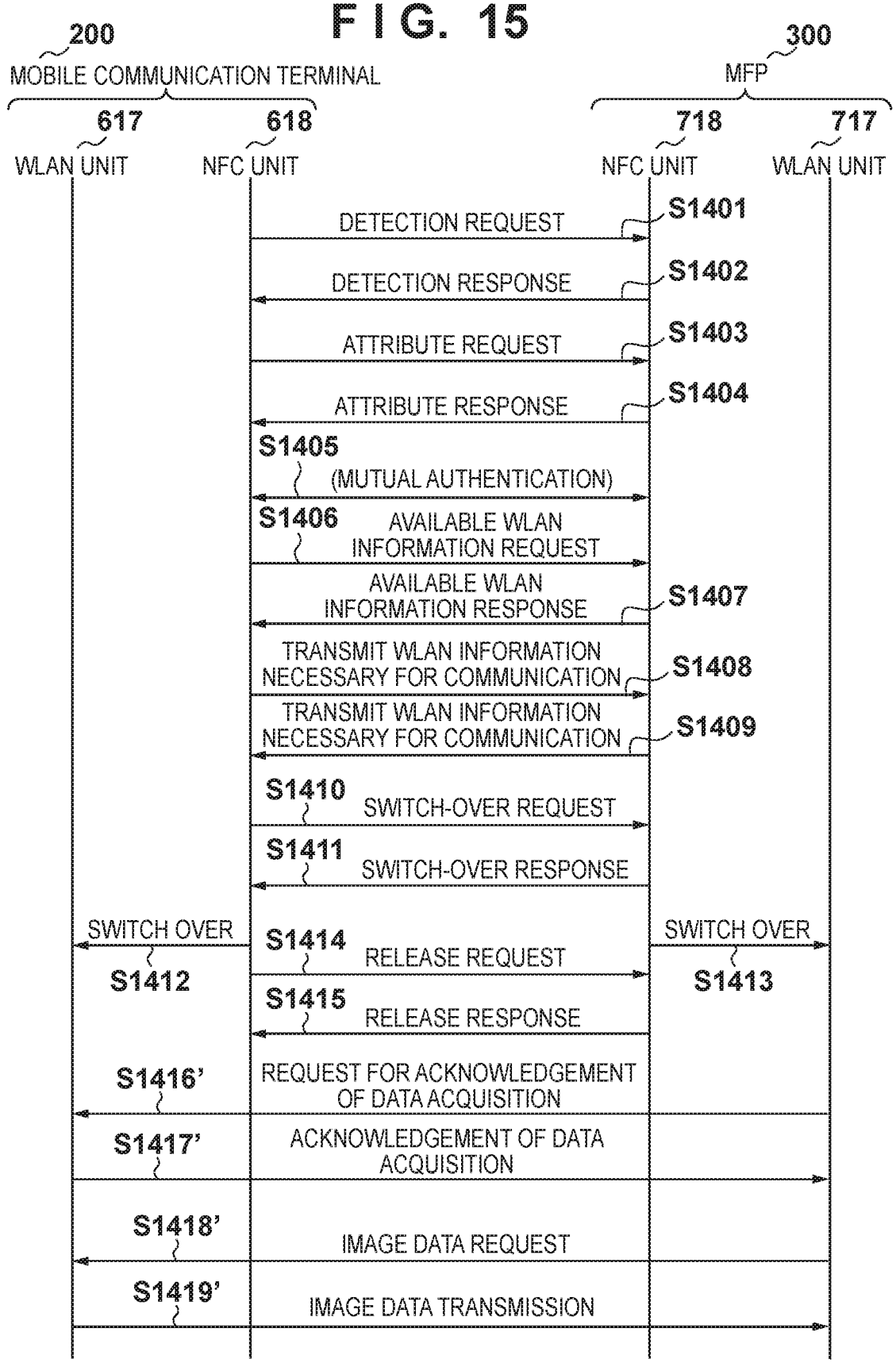
FIG. 15 is a sequence chart showing the sequence of performing pull-type communication in which the MFP takes initiative for transferring image data existing in the mobile communication terminal to the MFP.

FIG. 15 is a sequence chart showing the sequence of performing so-called pull-type communication in which the MFP 300 takes initiative for transferring image data existing in the mobile communication terminal 200 to the MFP 300 to print it. Note that the same step in FIG. 15 as that in FIG. 14 has the same reference symbol, and a description thereof will be omitted.

Referring to FIG. 15, after switching over from NFC communication to WLAN communication, the WLAN unit 717 transmits a request for acknowledgement of data acquisition to the WLAN unit 617 in step S1416'. The contents to be confirmed here include, for example, a data size of data to be transferred by the mobile communication terminal 200. Upon receiving the request for acknowledgement of transfer data, the WLAN unit 617 transmits a response in step S1417'. If a correct response has been received, and it has been determined in consideration of the free space of the MFP 300 that data transfer is possible, the WLAN unit 717 requests image data in step S1418'. Upon receiving a correct request, the WLAN unit 617 transmits the requested image data in step S1419'.

Figure 16:
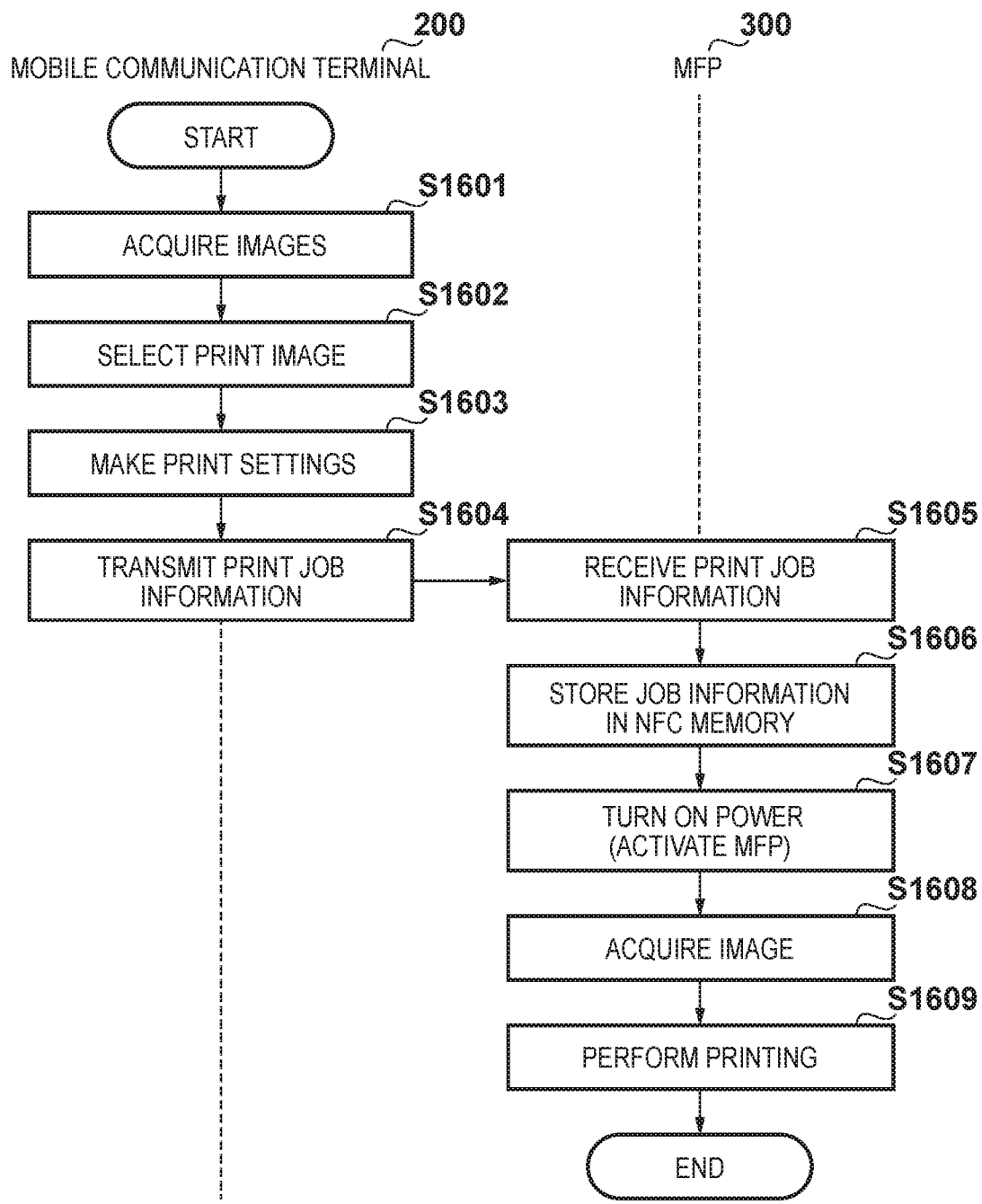
FIG. 16 is a sequence chart showing the sequence of executing processing of transmitting a job from the mobile communication terminal 200 to the MFP 300.

FIG. 16 is a sequence chart schematically showing the sequence from a time when the mobile communication terminal 200 reserves a job in the MFP 300 until the MFP 300 executes the job. A case in which when the MFP 300 is in the hard-off state, the MFP 300 receives a print job from the mobile communication terminal 200 will be described. Note that the print job is an instruction for the MFP 300 to execute printing, and the print job may include not image data but print job information such as an image file name, a file type, the amount of data, and a data storage destination, or may include both print job information and image data.

The operation of the mobile communication terminal 200 will be described first.

In step S1601, the mobile communication terminal 200 acquires image data from its image memory 605, the server apparatus 101, or the like. In step S1602, the terminal selects, among the acquired image data, image data to be used for printing, and sets the number of copies. In step S1603, the terminal makes print settings such as a printing paper size and paper type. In step S1604, the terminal transmits print job information to the MFP 300 by NFC communication. This processing requests the MFP to print an image. In this case, therefore, the print job includes only print job information as information necessary for printing such as the file name of the image data to be printed, the number of copies, and print settings.

The operation of the MFP 300 will be described next.

In step S1605, the MFP receives, in the passive mode, the print job information transmitted by the mobile communication terminal 200. Upon receiving the print job information, the MFP 300 stores the job information in the job storage unit 1006 of the NFC memory in step S1606. The storage destination is different for each piece of job information, and is as described above with reference to FIG. 10. In step S1607, the MFP 300 enters a normal activation state. When the MFP 300 enters the normal activation state, it acquires image data to be used for printing in step S1608, and prints an image based on the acquired image data in step S1609.

The detailed processing of the mobile communication terminal 200 will be described with reference to FIGS. 17 to 26, and the detailed processing of the MFP 300 will be explained with reference to FIGS. 27 to 31.

Processing Procedure of Mobile Communication Terminal 200 (FIGS. 17 to 26)

Figure 17:
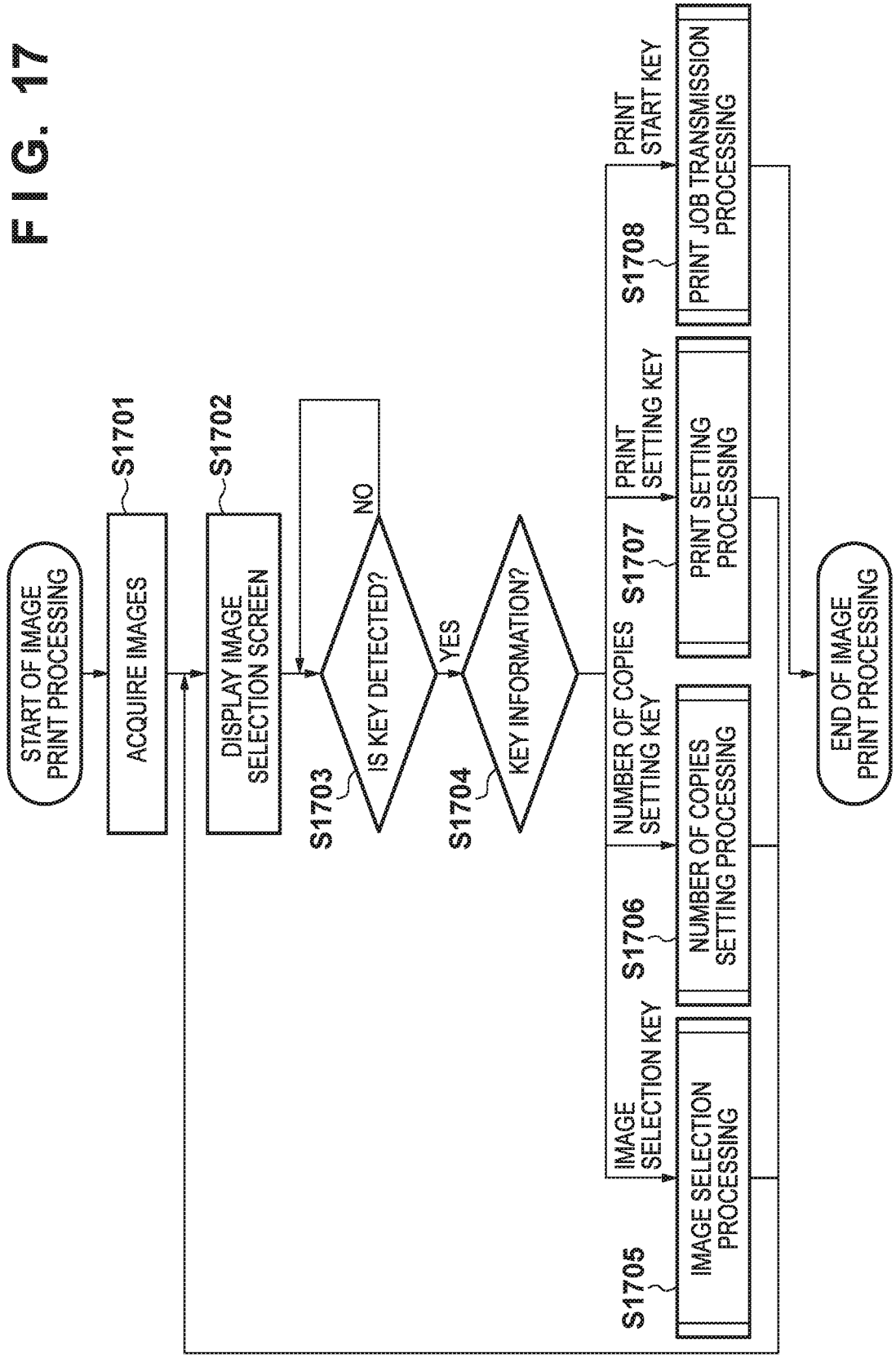
FIG. 17 is a flowchart illustrating processing of transmitting a print job.

FIG. 17 is a flowchart illustrating processing by the mobile communication terminal 200 from a time when an image print application of the mobile communication terminal 200 is activated until NFC communication ends. This application has a user interface used by the user to input data and output acquired data, and a function of causing the NFC unit to operate as an initiator.

In step S1701, the terminal acquires image data. The image data to be acquired here may be image data saved in the image memory 605 of the mobile communication terminal 200, or data obtained by downloading image data stored in the server apparatus 101 or downloading image data from a photo sharing site on the Internet. Furthermore, in step S1701, the terminal stores the path information and file name of the acquired image file in the RAM 604.

Figure 18:
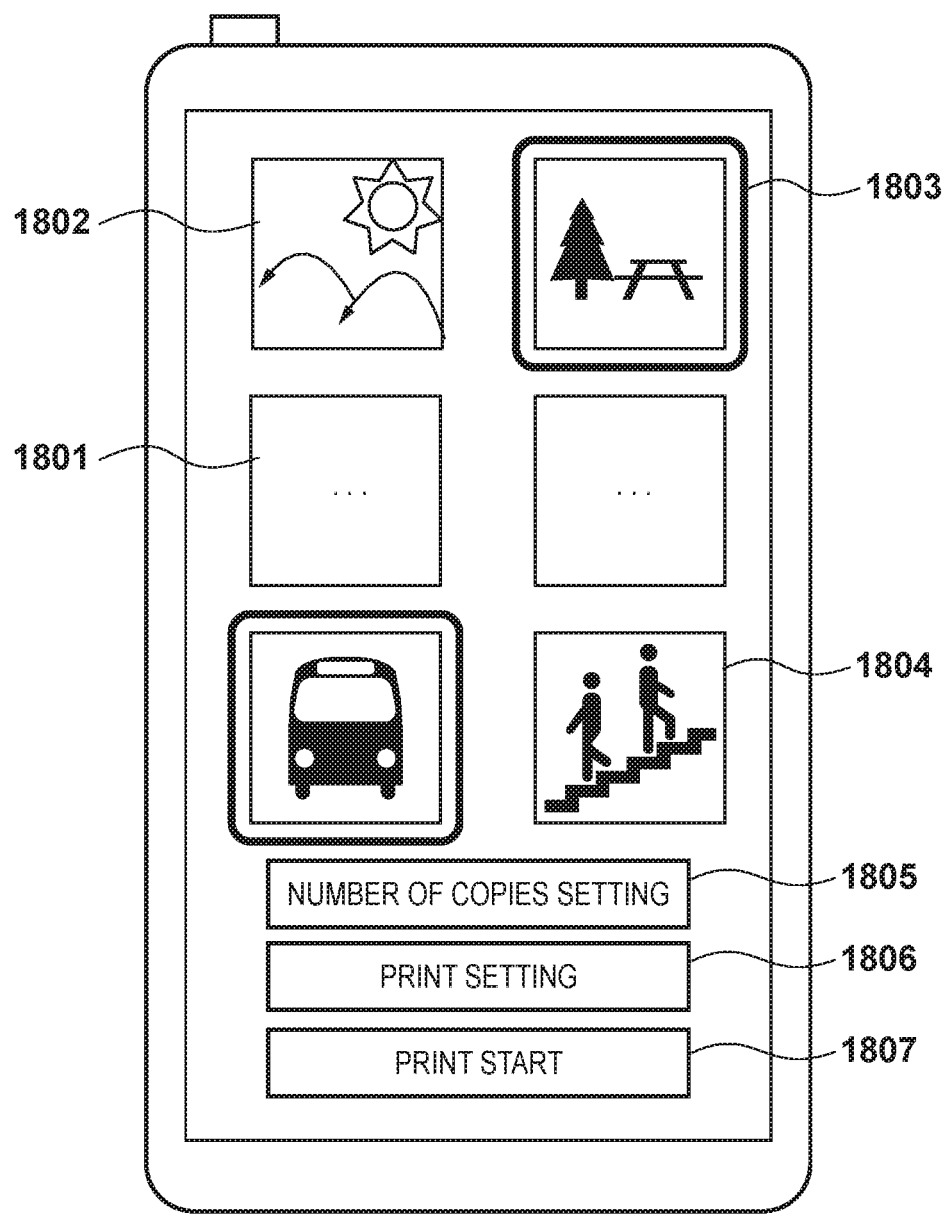
FIG. 18 is a view showing a display example of an image selection screen.

In step S1702, the terminal displays an image based on the acquired image data. FIG. 18 shows a display example of an image selection screen, which will be described later. The acquired image data are stored in the image memory 605.

In step S1703, the terminal detects a key operation of the operation unit 608, and stores information about the detected key in the RAM 604. In step S1704, the terminal checks the detected key information, and executes processing corresponding to the information in step S1705, S1706, S1707, or S1708. Note that detailed processes in steps S1705 to S1708 will be described later with reference to FIGS. 21 to 24, respectively.

Upon completion of image selection processing in step S1705, number of copies selection processing in step S1706, or print selection processing in step S1707, the process returns to step S1702 to display the image selection screen, and stands by for key detection in step S1703. On the other hand, in step S1708, the terminal performs NFC communication to transmit, to a target, information about an image to be printed, information about the number of copies of each image, and print setting information, which have been set in steps S1705 to S1707, respectively. Upon completion of the print job transmission processing in step S1708, the image print processing is terminated.

FIG. 18 is a view showing an example of the screen which is displayed on the display unit 203 in step S1702.

Some image display regions 1801 are arranged on the display unit 203. Thumbnail images 1802 of the image data acquired in step S1701 are displayed in the image display regions 1801. The locations of the images displayed in the image display regions 1801 serve as image selection keys. When the user presses or touches the image selection key, it is considered that the image selection key has been selected. If selection of an image selection key 1804 is detected, a focus 1803 representing an image selection state is displayed. If the same image selection key is detected again, the focus 1803 is set in a non-display mode.

Figure 19:
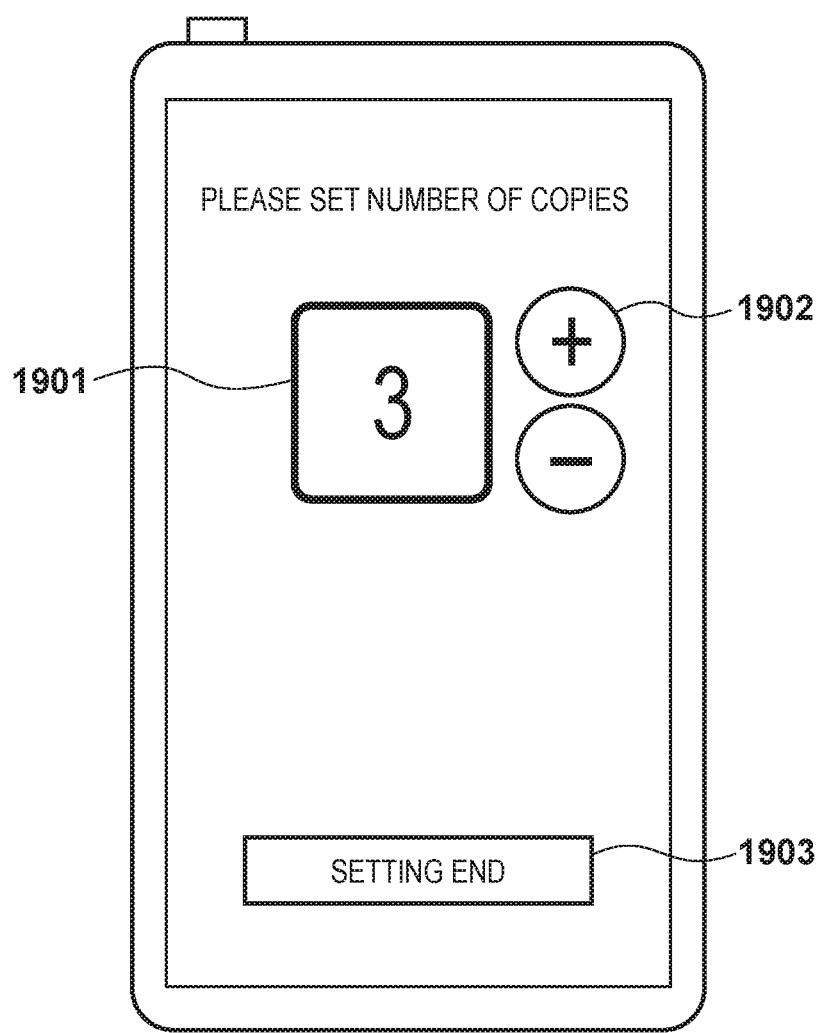
FIG. 19 is a view showing a display example of a number of copies selection screen.
Figure 20A:
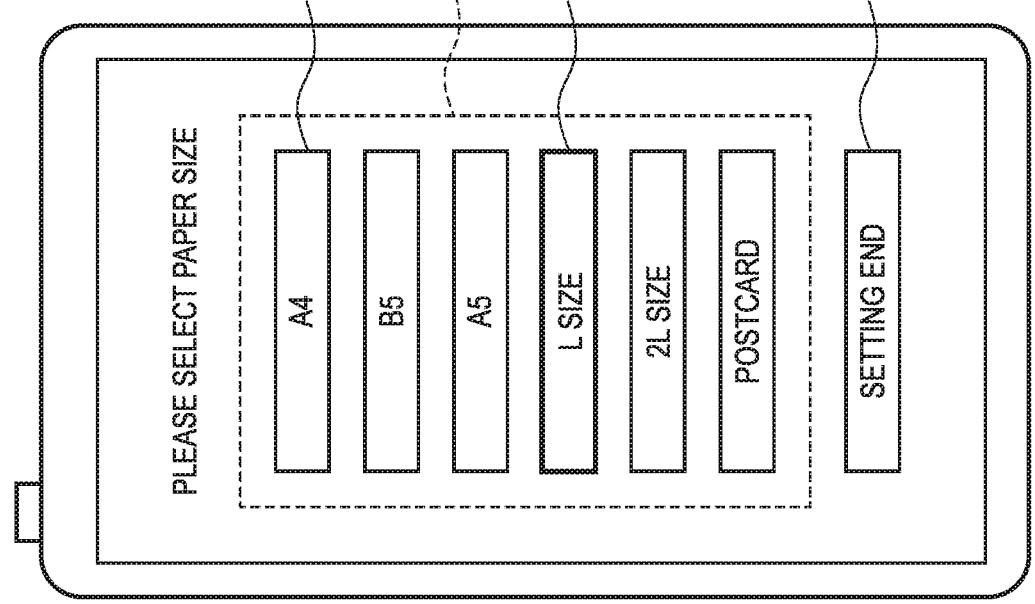
FIGS. 20A and 20B are views each showing a display example of a print setting screen.
Figure 20B:
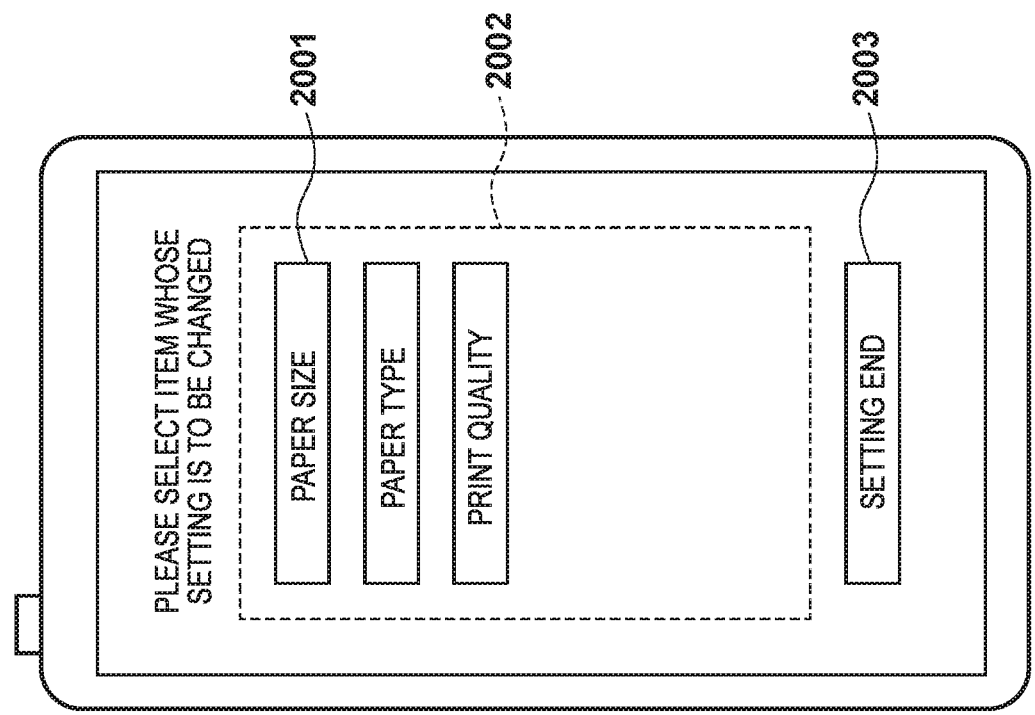

If press or touch of a number of copies setting key 1805 is detected on the display screen, a number of copies setting screen shown in FIG. 19 is displayed. If press or touch of a print setting key 1806 is detected, a print setting screen shown in FIG. 20A or 20B is displayed. If press or touch of a print start key 1807 is detected, print processing is executed according to a flowchart shown in FIG. 24.

Figure 21:
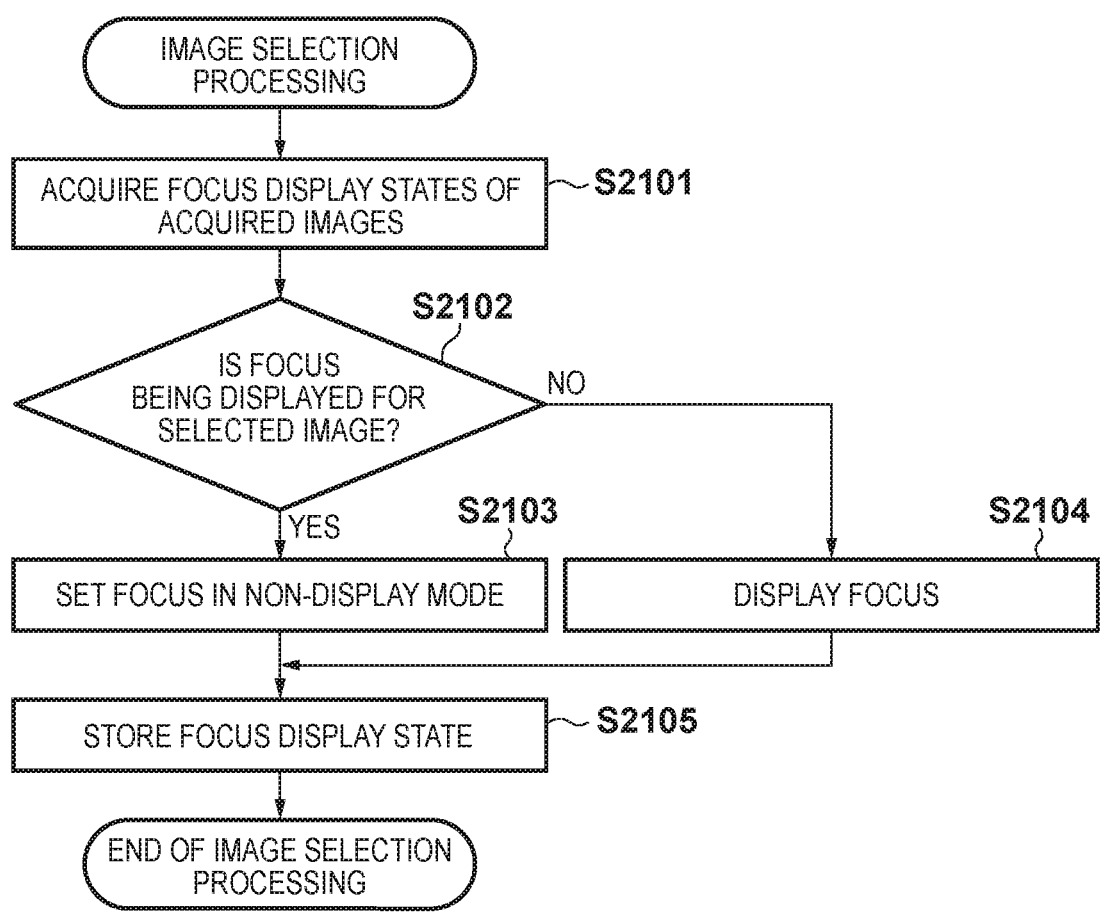
FIG. 21 is a flowchart illustrating processing of selecting an image.

FIG. 21 is a flowchart illustrating details of the image selection processing in step S1705.

In step S2101, the focus display state of each image is acquired. The focus display state is stored in the RAM 604, and its initial value indicates a focus non-display mode. In step S2102, it is checked whether or not a focus is being displayed for a selected image. If it is determined that the focus is being displayed, the process advances to step S2103 to set the focus in the non-display mode. On the other hand, if it is determined that the focus is in the non-display mode, the process advances to step S2104 to set the focus in a display mode.

In step S2105, the focus display state after the focus display change operation is stored in the RAM 604, thereby terminating the image selection processing.

Figure 22:
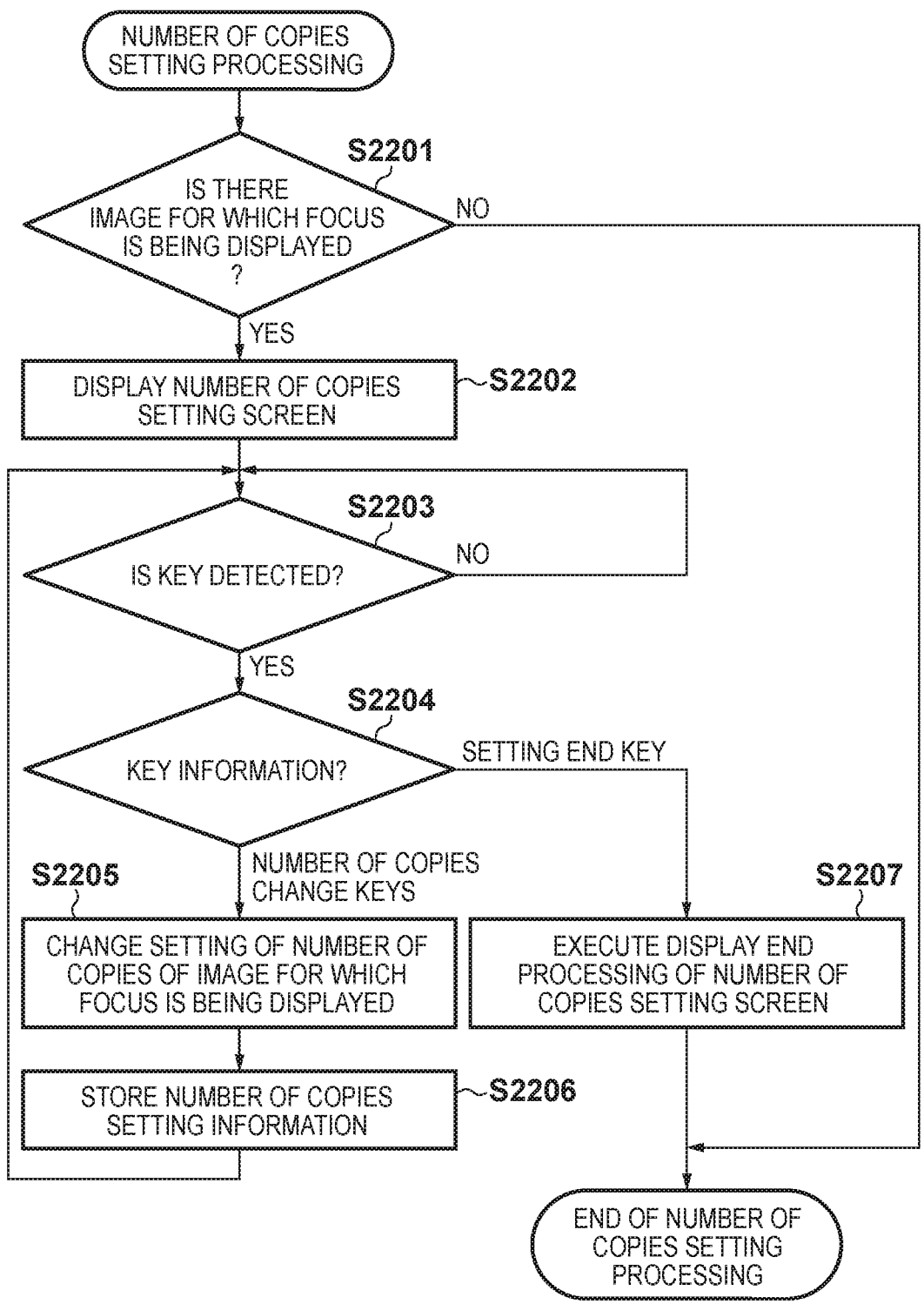
FIG. 22 is a flowchart illustrating processing of setting the number of copies.

FIG. 22 is a flowchart illustrating details of the number of copies selection processing in step S1706. The processing is executed to change only the number of copies of a selected image.

If press or touch of the number of copies setting key 1805 is detected, it is checked in step S2201 whether or not there is an image for which the focus is being displayed. If it is determined that there is an image for which the focus is being displayed, the process advances to step S2202 to display the number of copies setting screen; otherwise, the number of copies selection processing is terminated. FIG. 19 is a view showing a display example of the number of copies setting screen.

It is checked in step S2203 whether or not number of copies change keys 1902 or number of copies setting end key 1903 shown in FIG. 19 is operated. If a key operation is detected, the process advances to step S2204 to check the contents of the detected key.

If an operation of the number of copies change key 1902 is detected, the process advances to step S2205 to change the setting of the number of copies of the image for which the focus is being displayed. In the example shown in FIG. 19, "+" is pressed or touched once, a value in a number of copies display region 1901 is incremented by 1. If "−" is pressed or touched once, the value in the number of copies display region 1901 is decremented by 1. In step S2206, the changed setting value of the number of copies of each image is stored in the RAM 604. After that, the process returns to step S2203. On the other hand, if an operation of the number of copies setting end key 1903 is detected, the process advances to step S2207 to terminate display of the number of copies setting screen. The screen then returns to the image selection screen shown in FIG. 18.

Figure 23:
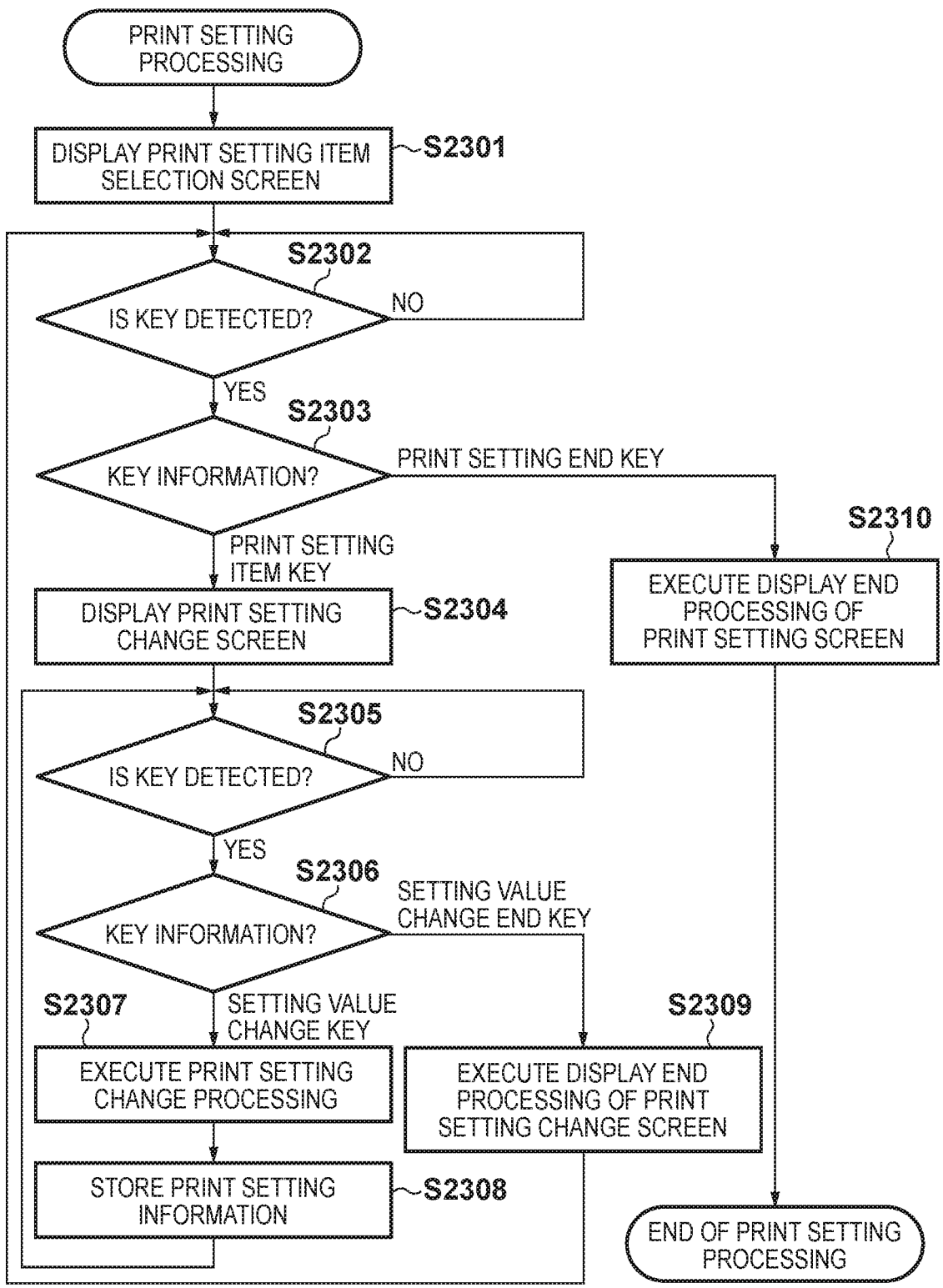
FIG. 23 is a flowchart illustrating processing of making print settings.

FIG. 23 is a flowchart illustrating details of the print setting processing in step S1707.

Upon detecting press or touch of the print setting key 1806, a print setting item selection screen is displayed in step S2301. FIG. 20A is a view showing a display example of the print setting item selection screen. In this example, a print setting list 2002 is displayed on the display screen, which enables to change the paper size, paper type and print quality.

In step S2302, the process stands by for detection of press or touch of a key on the print setting item selection screen shown in FIG. 20A. Upon detecting a key, the process advances to step S2303 to check the contents of the detected key.

If an operation of a print setting item key 2001 is detected, the process advances to step S2304 to display a print setting change screen. FIG. 20B is a view showing a display example of the print setting change screen for changing the paper size. In this example, a setting value list 2012 is displayed on the display screen, which enables to change the paper size to A4, B5, A5, L size, 2L size or postcard. Note that the selected paper size is displayed with a focus 2013. In step S2305, the process stands by for detection of press or touch of a key on the print setting change screen shown in FIG. 20B. Upon detecting a key, the process advances to step S2306 to check the contents of the detected key.

If an operation of a setting value change key 2011 is detected, the process advances to step S2307. If an operation of a setting value change end key 2014 is detected, the process advances to step S2309. The paper size is changed in step S2307, and print setting information after the change operation is stored in the RAM 604 in step S2308. A method of changing the paper type or print quality is the same as that of changing the paper size, and a description thereof will be omitted. On the other hand, in step S2309, display of the print setting change screen is terminated to return to display of the print setting item selection screen shown in FIG. 20A.

If an operation of a print setting end key 2003 is detected in steps S2302 and S2303, the process advances to step S2310 to terminate display of the print setting screen, thereby returning to the image selection screen shown in FIG. 18.

FIG. 24 is a flowchart illustrating details of the print job transmission processing in step S1708.

In step S2401, the number of copies information stored in the RAM 604 in step S2206 is acquired. In step S2402, the print setting information stored in the RAM 604 in step S2308 is acquired.

FIG. 25A is a view showing an example of the data structure of the number of copies setting information. In this example, path/file name information 2501 for identifying a file and number of copies information 2502 are managed as a set. The data structure according to the present invention is not limited to this, and the pieces of information may be managed independently of each other. FIG. 25B is a view showing an example of the data structure of the print setting information. FIG. 25B shows a case in which paper size information 2511, paper type information 2512, and print quality information 2513 are managed as a set. The data structure according to the present invention is not limited to this, and the pieces of information may be managed independently of each other. Upon acquiring the number of copies information and print setting information, the process advances to step S2403.

In step S2403, the mobile communication terminal 200 becomes an initiator, and moves to a mode for detecting the NFC unit. In this example, the terminal 200 becomes an initiator according to the processing described with reference to FIG. 11. Note that the communication mode may be the passive mode or active mode. To operate in the active mode, however, it is necessary to supply a power to the NFC unit 718 even if the MFP 300 is in the hard-off state by, for example, separating the power supply subsystem of the NFC unit from that of the MFP. Upon start of the operation as the initiator, the process advances to step S2404 to detect an apparatus serving as a communication party.

If an apparatus is detected, the process advances to step S2405; otherwise, the process stands by for detection of an apparatus in step S2404. The time taken to search for an apparatus and the number of times a search operation is executed depend on an application. The operation may be interrupted when a given time elapses or the operation is executed a given number of times, or the user may select to interrupt the operation.

The terminal transmits an attribute request to the MFP in step S2405, and receives an attribute response from the MFP in step S2406. If a correct response is not received, an attribute request is transmitted again, or communication is interrupted. If a correct response is received, the process advances to step S2407.

In step S2407, it is determined whether or not it is necessary to change parameters. If it is necessary to change the parameters, the process advances to step S2408; otherwise, the process advances to step S2410. In step S2408, a parameter selection request is transmitted to the MFP. In step S2409, the terminal receives a parameter selection response. If a correct response is not received, a parameter selection request is transmitted again, or communication is interrupted. If a correct response is received, the process advances to step S2410.

In step S2410, the terminal transmits job information to the MFP serving as a target. The transmitted data is written in the NFC memory 805 of the NFC unit 718 of the MFP 300.

The terminal transmits a release request to the MFP in step S2411, and receives a release response from the MFP in step S2412. If a release response is received, the target has been released. In step S2413, the terminal displays, on the display unit 203, a message screen indicating that transmission of the data to the target is complete. After that, the process ends.

Figure 26:
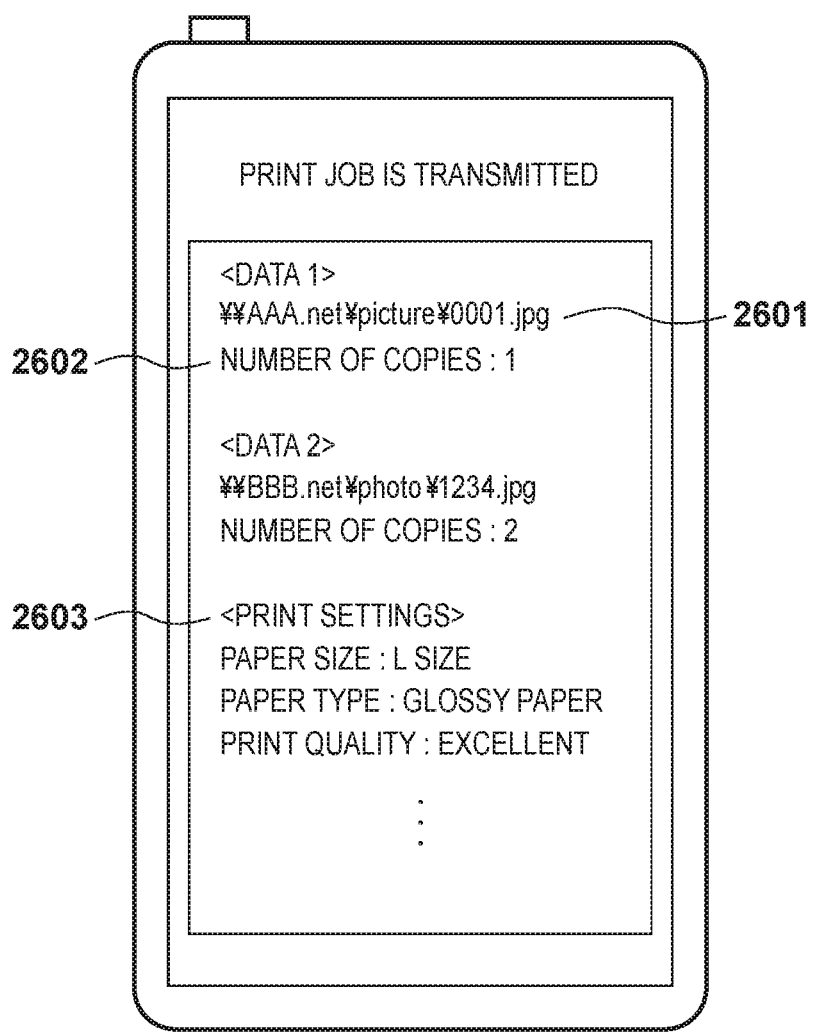
FIG. 26 is a view showing a display example of a print job transmission completion screen.

FIG. 26 is a view showing an example of a transmission completion screen displayed in step S2413. Note that although the screen is displayed after receiving a release response, the present invention is not limited to this. The screen may be displayed after transmitting number of copies/print setting information in step S2410, or may not be displayed. The displayed contents are not limited to them, and the name of the MFP as a transmission destination and the like may also be displayed. In this example, print data location information 2601, number of copies information 2602, and print setting information 2603 are displayed.

Processing Procedure of MFP 300 (FIGS. 27 to 31)

Although a case in which the MFP 300 is in the hard-off state has been described above with reference to FIG. 16 for the sake of simplicity, a description including an operation when the MFP is in the normal state will now be provided.

Figure 27:
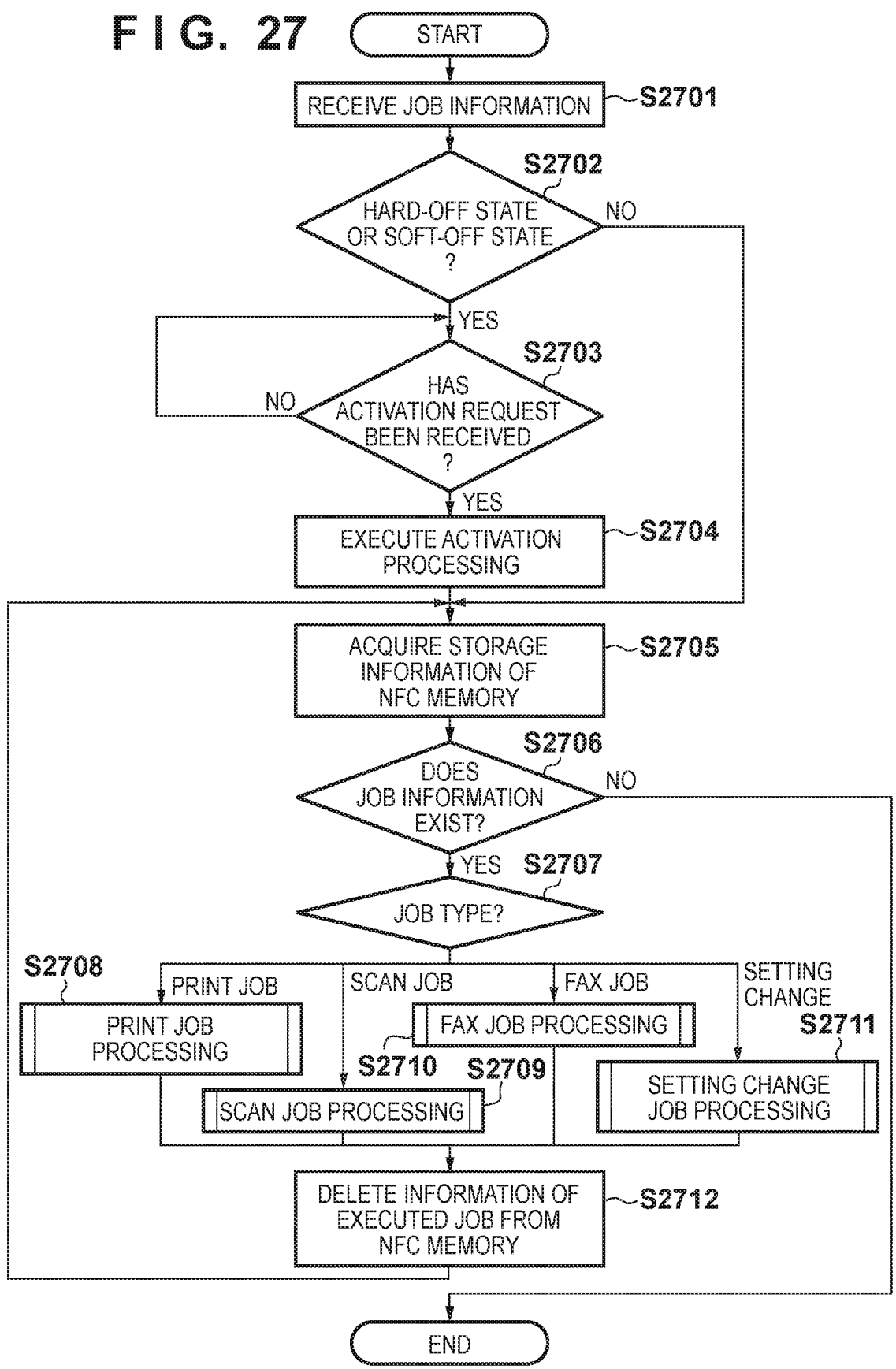
FIG. 27 is a flowchart illustrating job execution processing.

FIG. 27 is a flowchart illustrating processing from a time when the MFP 300 receives a print job until it executes the job.

In step S2701, the MFP 300 receives the job information which has been transmitted by the mobile communication terminal 200 using NFC communication in step S2410. At this time, the mobile communication terminal 200 becomes an initiator and the MFP 300 becomes a target. The communication mode is the passive mode if the MFP 300 is in the hard-off state or soft-off state. If the MFP 300 is in the normal state, the communication mode may be the passive mode or active mode. The hard-off state indicates a state before the power is turned on, the soft-off state indicates a state in which the power is turned on but the main program is not activated, and the normal state indicates a state in which a program is normally activated. The received information is stored in the NFC memory 805 of the NFC unit 718 of the MFP 300. As described with reference to FIG. 10, the storage location is different for each type of job.

It is checked in step S2702 whether or not the MFP 300 is in the hard-off state or soft-off state (that is, the MFP 300 is in a power-off state). If the MFP is in the hard-off state or soft-off state, the process advances to step S2703; otherwise, the process advances to step S2705.

If the apparatus state of the MFP 300 is in the hard-off state or soft-off state, the process stands by for an activation request to the MFP 300 in step S2703. Upon receiving an activation request, the process advances to step S2704. Processing of activating the MFP 300 is performed to return the state of the MFP 300 to the normal state. If the job information of the print job is stored in the NFC memory 805, this can be considered as an activation request. Upon completion of the activation processing, that is, upon returning to the normal state, the process advances to step S2705.

In step S2705, the MFP acquires the storage information of the NFC memory 805, and transfers and stores it in the RAM 704. In step S2706, the CPU 702 checks whether or not the job information is in the RAM 704. If the job information is in the RAM, the process advances to step S2707; otherwise, the job execution processing is terminated.

If there is the job information in the RAM, the MFP checks the type of job in step S2707, and executes processing corresponding to the type of job in steps S2708 to S2711. Details of processes in steps S2708 to S2711 will be described with reference to FIGS. 28 to 31, respectively. Upon completion of the job processing, the information of the executed job is deleted from the NFC memory 805 in step S2712. Upon deleting the job information, the process returns to step S2705 to acquire job information and execute a job.

Figure 28:
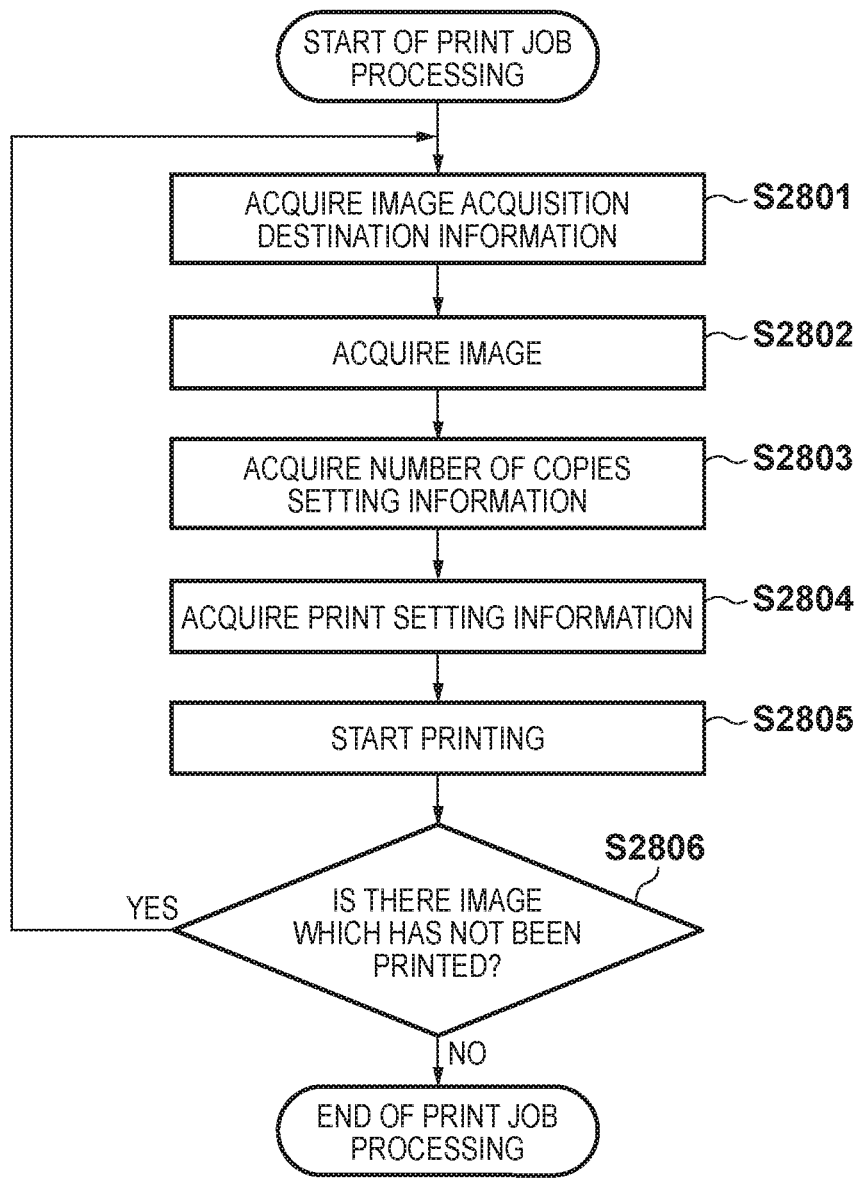
FIG. 28 is a flowchart illustrating details of print job processing.

FIG. 28 is a flowchart illustrating details of print job processing in step S2708.

In step S2801, the MFP acquires image acquisition destination information indicating the location of image data to be used for printing. This is, for example, information indicating the location of image data like the file location information 2501. In steps S2802 to S2804, image data, the number of copies, and print setting information are acquired and stored in the RAM 704, respectively. After that, the MFP starts printing in step S2805.

After printing, the CPU 702 checks in step S2806 whether or not there is image data which has not been printed. If there is such image data, the process returns to step S2801; otherwise, the print job processing is terminated. This processing is performed if one print job can print a plurality of images. The processing in step S2806, therefore, can be omitted if one print job can print only one image. Although a case in which an image is printed has been described, a print target is not limited to an image, and may be a document (document data) or the like. The processing order is not limited to this, and the number of copies setting information and print setting information may be acquired before acquiring the image data.

Figure 29:
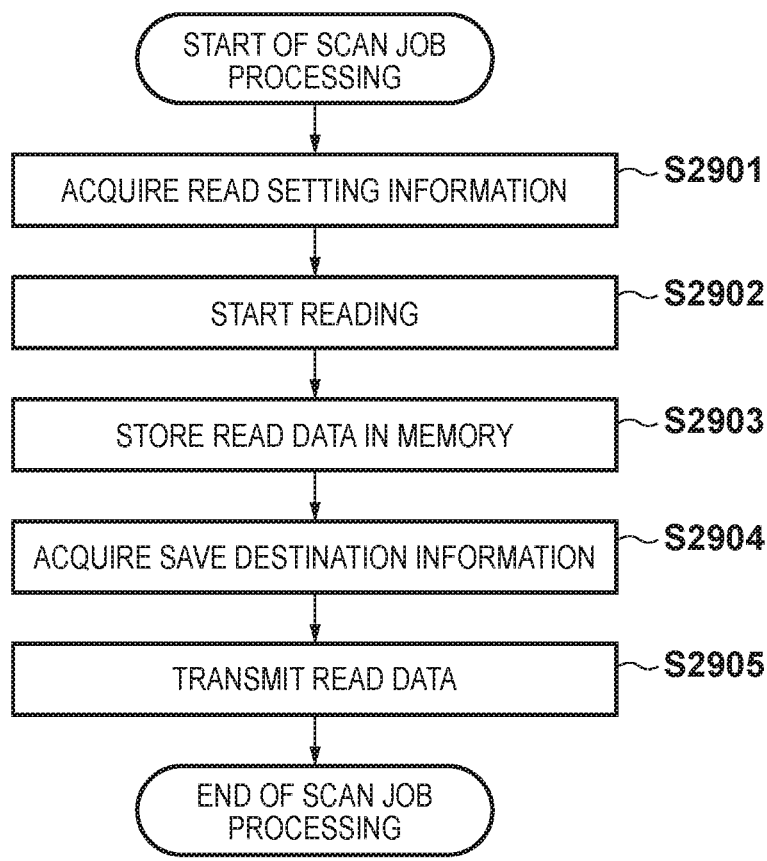
FIG. 29 is a flowchart illustrating details of scan job processing.

FIG. 29 is a flowchart illustrating details of scan job processing in step S2710.

In step S2901, the MFP acquires read setting information from scan job information. The read setting information includes a read document size, a reading color (color or monochrome), and a read data save format. The MFP reads an original placed on the document table 301 in step S2902, and stores data obtained by reading the original in the RAM 704 in step S2903. In step S2904, the MFP acquires, from the scan job information, information about a save destination where the data is saved, and stores it in the RAM 704. The save destination may be the non-volatile memory 705 of the MFP 300, or an apparatus such as the server apparatus 101 other than the MFP 300. In step S2905, the MFP transmits the read data to the save destination acquired in step S2904.

Figure 30:
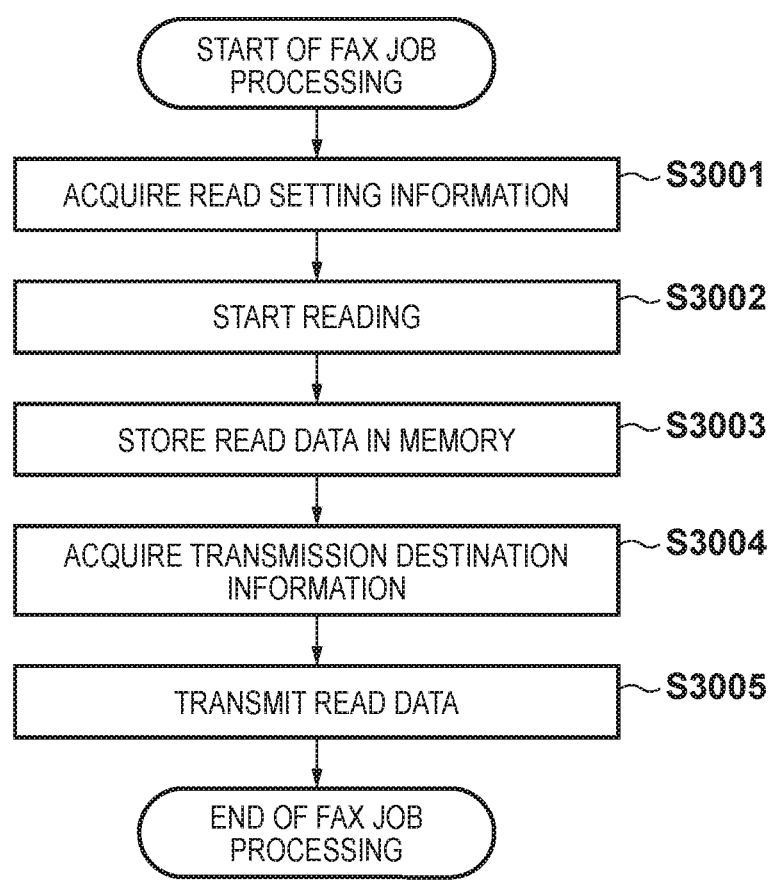
FIG. 30 is a flowchart illustrating details of facsimile (FAX) job processing.

FIG. 30 is a flowchart illustrating details of facsimile (FAX) job processing in step S2711.

In step S3001, the MFP acquires read setting information. The MFP reads an original placed on the document table 301 in step S3002, and stores the read data in the RAM 704 in step S3003. The MFP acquires transmission destination information such as the telephone number of a facsimile transmission destination in step S3004, and transmits the read data in step S3005.

Figure 31:
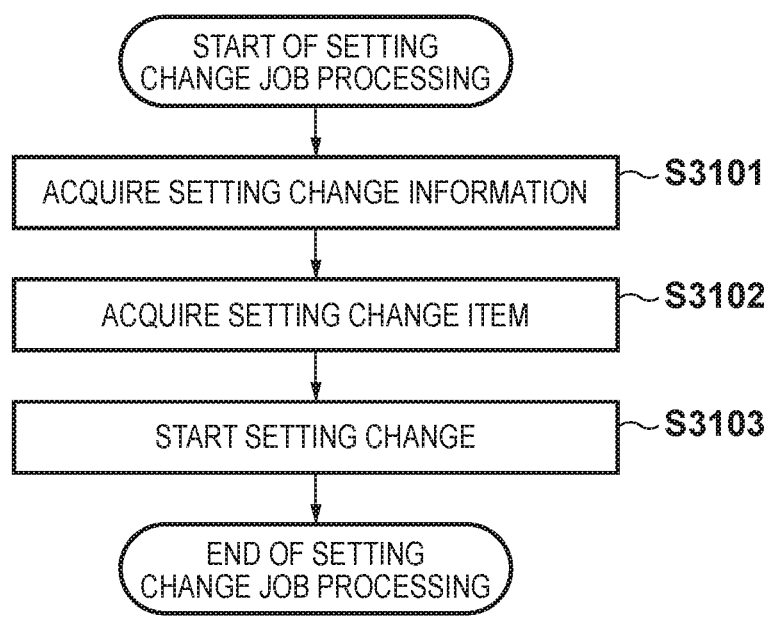
FIG. 31 is a flowchart illustrating details of setting change job processing.

FIG. 31 is a flowchart illustrating details of setting change processing in step S2712.

In step S3101, the MFP acquires setting change information. The setting change information is information such as the LAN setting information of the MFP 300 and the telephone book of facsimile transmission destinations, and is stored in the setting information saving area 906. The MFP acquires a setting change item in step S3102, and writes it in the setting information saving area 906 in step S3103. If, for example, the LAN setting information is changed, the MFP performs a write operation in only an area, where the LAN setting information is stored, of the setting information saving area 906.

According to the above-described embodiment, the mobile communication terminal can store job information in the MFP even if the MFP is in the hard-off state or soft-off state. When the MFP 300 moves to the normal state, it can execute the job information.

Note that in the above embodiment, when a printing apparatus is turned on to return to the normal state, data to be printed is acquired from a mobile terminal. Data to be printed, however, may be acquired from an external server. Alternatively, data may be acquired from the internal memory of the printing apparatus or a memory inserted in the printing apparatus.

Furthermore, the printing apparatus cannot immediately perform printing not only when the printing apparatus is in the power-off state but also in another situation, for example, when the printing apparatus is in a sleep state or an error state such as run out of ink.

Note that printing in the printing apparatus has been exemplified as processing executed by a job in the above embodiment. The present invention is not limited to this, and various processes are possible.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048624, filed Mar. 5, 2012, which is hereby incorporated by reference herein in its entirety.

What is claimed is:

1. A printing apparatus which performs wireless communication with a communication device, comprising:
    a memory configured to store a program;
    at least one processor configured to execute the program so that the at least one processor functions as:
        a first communication portion which performs wireless communication according to a first communication method; and
        a second communication portion which performs wireless communication according to a second communication method,
    wherein the at least one processor performs wireless communication with the communication device via the first communication portion,
    the at least one processor activates a function for obtaining an image to be printed via the second communication portion,
    wherein the function is activated based on particular information being communicated by the wireless communication with the communication device via the first communication portion, the particular information indicating a storage location of the image in the communication device,
    the at least one processor obtains the image to be printed, from the communication device via the second communication portion, based on the particular information, and
    the at least one processor executes printing processing based on the obtained image.

2. The apparatus according to claim 1, wherein the at least one processor obtains the image, by responding to the communication device by the second communication portion, in response to a predetermined request which the second communication portion has received from the communication device, and receiving the image which the communication device has transmitted according to the response.

3. The apparatus according to claim 1, wherein the first communication method is NFC.

4. The apparatus according to claim 1, wherein the second communication method is wireless LAN (WLAN).

5. A communication method for performing wireless communication between a printing apparatus and a communication device according to a first communication method and a second communication method, comprising:
    performing, by the communication device and the printing apparatus, a first wireless communication with the communication device according to the first communication method;
    activating a function of the printing apparatus for obtaining an image according to the second communication method,
    wherein the function is activated based on particular information being communicated by the wireless communication with the communication device via the first communication method, the particular information indicating a storage location of the image in the communication device;
    transmitting the image, from the communication device to the printing apparatus, according to the second communication method based on the particular information; and
    executing, by the printing apparatus, printing processing based on the transmitted image.

6. The method according to claim 5, further comprising:
    receiving, from the printing apparatus, information for the second communication method by the first communication method, at the communication device;
    transmitting, based on the received information, the image, according to the second communication method at the communication device,
    wherein the image is obtained at the printing apparatus.

7. The method according to claim 6, wherein at the transmitting, the communication device makes a predetermined request to the printing apparatus, based on the received data, using the second communication method, and transmits the image according to a response to the predetermined request from the printing apparatus.

8. The method according to claim 5, wherein the first communication method is NFC.

9. The method according to claim 5, wherein the second communication method is wireless LAN (WLAN).

10. The method according to claim 5, further comprising:
displaying, by the communication device, a first screen in which information for printing the image by the printing apparatus is included, on a display portion of the communication device;
displaying, by the communication device, a second screen for print setting on the display portion of the communication device in a case where a user performs setting designation; and
controlling, by the communication device, an operation mode of the communication device such that the mode becomes a predetermined mode in a case where a user performs a predetermined designation in the first screen, while the mode does not become the predetermined mode in a case where the second screen is displayed,
wherein the predetermined mode is a mode which enables the printing apparatus to print an image to be printed corresponding to the information included in the first screen in a case where the printing apparatus is detected at the communication device according to the first communication method.

11. The method according to claim 10, wherein the display portion comprises a touch panel, and the setting designation and the predetermined designation are touches to the touch panel.

12. The method according to claim 10, wherein a display item settable at the second screen includes at least one of a paper size, a paper type, print quality and a number of copies for printing.

13. A control method of a printing apparatus in which at least one processor of the printing apparats performs wireless communication with a communication device via a first communication portion of the printing apparatus according to a first communication method, comprising:
activating, by the at least one processor, a function for obtaining an image to be printed via a second communication portion of the printing apparatus according to a second communication method,
wherein the function is activated based on particular information being communicated by the wireless communication with the communication device via the first communication portion, the particular information indicating a storage location of the image in the communication device;
obtaining, by the at least one processor, the image to be printed from the communication device via the second communication portion, based on the particular information; and
executing, by the at least one processor, printing processing based on the obtained image.

* * * * *